US010412318B1

(12) United States Patent
Ong et al.

(10) Patent No.: US 10,412,318 B1
(45) Date of Patent: Sep. 10, 2019

(54) SYSTEMS AND METHODS FOR PROCESSING A VIDEO STREAM DURING LIVE VIDEO SHARING

(71) Applicant: Motorola Solutions, Inc., Chicago, IL (US)

(72) Inventors: Yan Pin Ong, Bukit Mertajam (MY); Chun Meng Tan, Bayan Lepas (MY); Carmen Jia Yi Siau, Kota Kinabalu (MY)

(73) Assignee: Motorola Solutions, Inc., Chicago, IL (US)

(*) Notice: Subject to any disclaimer, the term of this patent is extended or adjusted under 35 U.S.C. 154(b) by 0 days.

(21) Appl. No.: 16/175,153

(22) Filed: Oct. 30, 2018

(51) Int. Cl.
*G06K 9/00* (2006.01)
*H04N 5/262* (2006.01)
*H04N 5/272* (2006.01)

(52) U.S. Cl.
CPC ....... *H04N 5/2628* (2013.01); *G06K 9/00718* (2013.01); *G06K 9/00765* (2013.01); *H04N 5/272* (2013.01)

(58) Field of Classification Search
CPC .. H04N 5/2628; H04N 5/272; G06K 9/00718; G06K 9/00765
See application file for complete search history.

(56) References Cited

U.S. PATENT DOCUMENTS

| 4,546,383 | A | 10/1985 | Abramatic et al. |
| 9,589,595 | B2 | 3/2017 | Gao et al. |
| 9,729,834 | B2 | 8/2017 | Desimone et al. |
| 2009/0245571 | A1 | 10/2009 | Chien et al. |
| 2014/0198838 | A1 | 7/2014 | Andrysco et al. |
| 2015/0213604 | A1 | 7/2015 | Li et al. |
| 2016/0173882 | A1 | 6/2016 | Mishra et al. |
| 2017/0111671 | A1 | 4/2017 | Bhogal et al. |

*Primary Examiner* — Michael E Teitelbaum
(74) *Attorney, Agent, or Firm* — Baker Botts L.L.P.

(57) ABSTRACT

Systems and methods for processing video stream data during live video sharing may reduce network bandwidth consumption by streaming full and partial video frames. An image processing device receives information from an image capturing device including a first full video frame, an object of interest identifier, and a movement profile of the image capturing device. The image processing device extracts a background portion from the first full video frame, exclusive of the object of interest. Subsequently, the image processing device receives a partial second video frame including only an object of interest portion, applies a transformation to the extracted background portion based on the movement profile, and displays a representation of the second video frame including the object of interest portion of the second video frame and the transformed background portion. The image processing device performs fine tuning to compensate for small background or movement profile changes between partial frames.

20 Claims, 12 Drawing Sheets

SYSTEMS AND METHODS FOR PROCESSING A VIDEO STREAM DURING LIVE VIDEO SHARING

BACKGROUND OF THE INVENTION

The video quality achievable during real-time live video sharing is heavily dependent on the signaling quality, reliability, and consistency of the underlying communication network and of the connections to the network by video sharing devices. In situations in which there is no guarantee of a reliable, high-quality connection, techniques for reducing the network bandwidth consumed during video sharing are sometimes applied. Some existing methods for reducing network bandwidth consumption involve resolution reduction techniques, such as pixel reduction techniques, in which the resolution is uniformly reduced across each video frame. These techniques make no distinction between important objects or features depicted in each video frame and non-essential features depicted in each video frame.

These and other existing techniques may yield unacceptable results when used in certain public safety applications, such as when performing live video sharing during a car chase or while in pursuit of a suspect on foot. For example, a resolution reduction technique might obscure an important detail in the video frames such as a license plate number or a distinctive facial feature.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
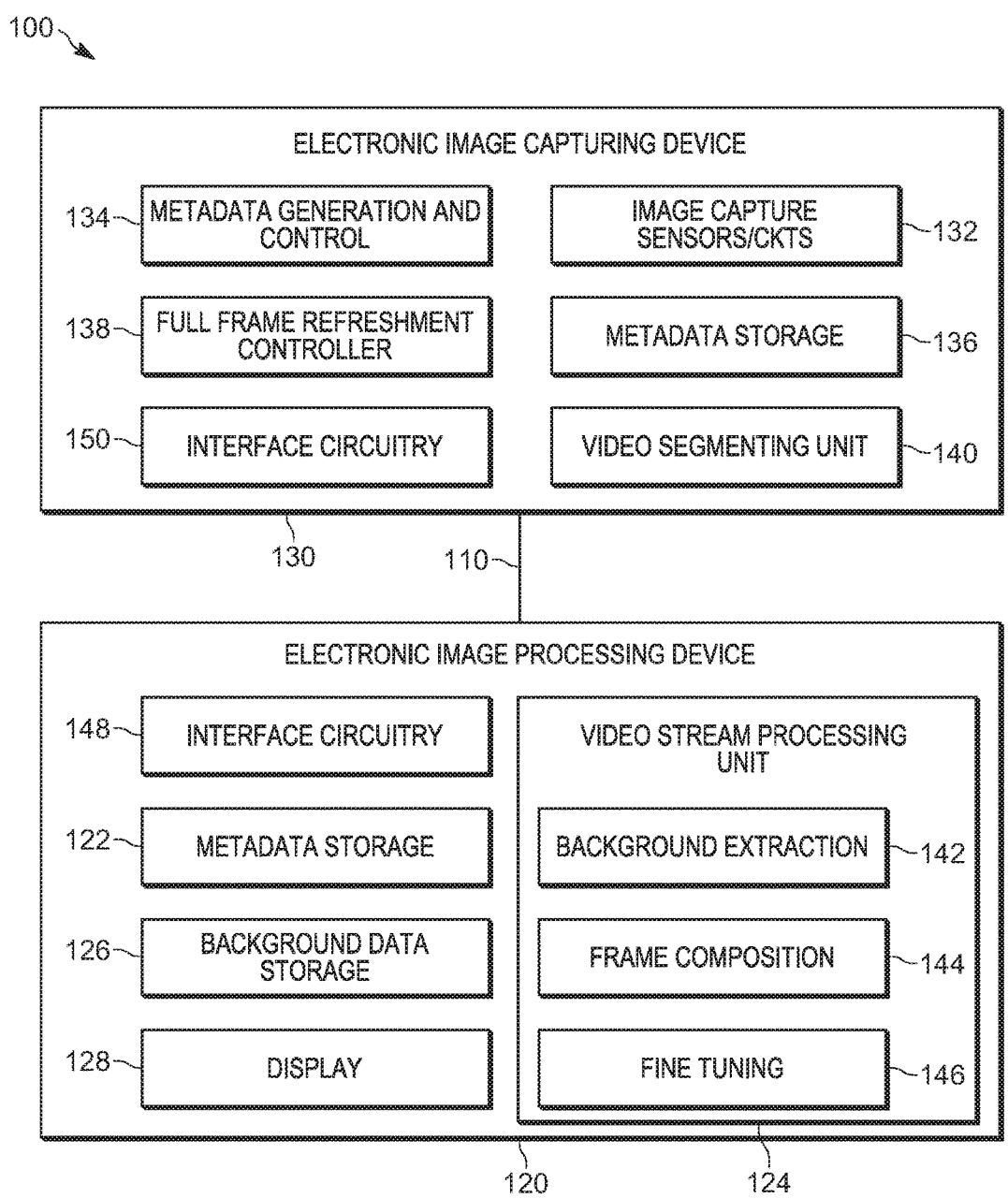
FIG. 1 is a block diagram of a system for live video sharing, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods, apparatus, and non-transitory, computer-readable storage media for processing a video stream during live video sharing. In one embodiment, a disclosed method includes receiving, at a receiving electronic computing device from an electronic image capturing device, first data representing a first full video frame of the video stream in which an object of interest and a first background portion exclusive of the object of interest are depicted, and first metadata associated with the first full video frame. The first metadata includes a first identifier of the object of interest within an object of interest portion of the first full video frame and a first movement profile for the electronic image capturing device including an indication of a current speed at which the electronic image capturing device is moving. The method also includes displaying, at a display coupled to the receiving electronic computing device, the first full video frame; extracting, by the receiving electronic device and dependent on the first identifier of the object of interest, the first background portion from the first full video frame; receiving, from the electronic image capturing device, second data representing an object of interest portion of a second full video frame in which the object of interest is depicted, the second data excluding data representing a second background portion of the second full video frame; applying, by the receiving electronic device and dependent on the first movement profile, a transformation to the extracted first background portion to create a transformed first background portion; and displaying, at the display, a representation of the second full video frame including the object of interest portion of the second full video frame and the transformed first background portion.

In one embodiment, a disclosed electronic image processing device includes a display, input interface circuitry operable to receive a video stream from an electronic image capturing device, and a video stream processing unit. The video stream processing unit is operable to receive, from the electronic image capturing device via the input interface circuitry, first data representing a first full video frame of the video stream in which an object of interest and a first background portion exclusive of the object of interest are depicted, and first metadata associated with the first full video frame. The first metadata includes a first identifier of the object of interest within an object of interest portion of the first full video frame, and a first movement profile for the electronic image capturing device including an indication of a current speed at which the electronic image capturing device is moving. The video stream processing unit is further operable to display, on the display, the first full video frame; to extract, dependent on the first identifier of the object of interest, the first background portion from the first full video frame; to receive, from the electronic image capturing device, second data representing an object of interest portion of a second full video frame in which the object of interest is depicted, the second data excluding data representing a second background portion of the second full video frame; to apply, dependent on the first movement profile, a transformation to the extracted first background portion to create a transformed first background portion; and to display, on the display, a representation of the second full video frame including the object of interest portion of the second full video frame and the transformed first background portion.

In one embodiment, a disclosed non-transitory, computer-readable storage medium has program instructions stored thereon that when executed by an electronic processor cause the electronic processor to perform receiving, from an electronic image capturing device, first data representing a first full video frame of the video stream in which an object of interest and a first background portion exclusive of the object of interest are depicted, and first metadata associated with the first full video frame. The first metadata includes a first identifier of the object of interest within an object of interest portion of the first full video frame, and a first movement profile for the electronic image capturing device including an indication of a current speed at which the electronic image capturing device is moving. When executed, the program instructions further cause the electronic processor to perform displaying, on a display device, the first full video frame; extracting, dependent on the first identifier of the object of interest, the first background portion from the first full video frame; receiving, from the electronic image capturing device, second data representing an object of interest portion of a second full video frame in which the object of interest is depicted, the second data excluding data representing a second background portion of the second full video frame; applying, dependent on the first movement profile, a transformation to the extracted first background portion to create a transformed first background portion; and displaying, on the display device, a representation of the second full video frame including the object of interest portion of the second full video frame and the transformed first background portion.

In at least some embodiments of the present disclosure, the systems and methods described herein may reduce the dependence on the wireless communication signal strength during live video sharing by reducing the network bandwidth consumed. The disclosed techniques may be well suited for use by public safety employees or others utilizing mobile devices including video cameras, such as body worn cameras or dashboard-mounted cameras. As described in more detail herein, for a majority of the video frames of a shared video stream, only an object of interest portion of the video frame is streamed to an electronic image processing device in a real-time manner. The receiving device may then render the respective background portions of these partial video frames by applying transformations based on a movement profile for the image capturing device to a background portion extracted from a previously received full video frame.

Full video frames may be pushed to the image processing device initially and when one of several trigger conditions is met. Metadata associated with each full video frame may also be pushed to the image processing device and may include an identifier of an object of interest depicted in the full video frame and the current movement profile for the image capturing device. The movement profile may include data indicating a speed, acceleration, direction, altitude, change in altitude, or velocity of the image capturing device. The trigger conditions for pushing a new full video frame to the image processing device may include a significant change in the movement profile of the image capturing device, a significant change in the background portion between video frames, or the completion of a full frame refreshment cycle. In some embodiments, each full video frame pushed to the image processing device may be pushed as a respective object of interest portion and a respective background portion that have been extracted from the full video frame by the image capturing device prior to being pushed to the image processing device. The disclosed techniques may allow an image processing device to decode video stream data received at slower rates, reducing network bandwidth consumption, while yielding good quality video from a live video sharing session.

FIG. 1 is a block diagram illustrating selected elements of a system 100 for live video sharing, in accordance with some embodiments. In the illustrated embodiment, system 100 includes an electronic image capturing device 130 and an electronic image processing device 120. Electronic image processing device 120 is communicatively coupled to electronic image capturing device 130 over interconnect 110, which may be a wired or wireless interconnect. In at least some embodiments, electronic image capturing device 130 may be a mobile device. For example, in some embodiments, electronic image capturing device 130 may be a stand-alone digital video camera such as, for example, a body worn camera or a dashboard-mounted camera. In other embodiments, electronic image capturing device 130 may be an electronic device within which a digital video camera is integrated, such as, for example, a smart telephone, a mobile radio, a tablet computer, or another type of portable or hand-held electronic device. In at least some embodiments, the electronic image processing device 120 may be moving during all or a portion of a live video sharing session.

In some embodiments, electronic image processing device 120 may be a portable or mobile device with which electronic image capturing device 130 shares data representing full or partial video frames during a live video sharing session. In such embodiments, the electronic image processing device 120 may be moving or stationary at particular points in time during a live video sharing session. In other embodiments, electronic image processing device 120 may be a stationary computing device, such as a laptop computing device, a desktop computing device, or a server device that operates in a fixed location during a live video sharing session.

In some embodiments, electronic image capturing device 130 may be a hand-held smart telephone or radio operated by a public safety employee and electronic image processing device 120 may be a stationary computing device of a public safety operator or dispatcher. In other embodiments, electronic image capturing device 130 may be a body camera worn by a public safety employee or a dashboard-mounted camera operated by a public safety employee and electronic image processing device 120 may be a stationary computing device of a public safety operator or dispatcher. In some embodiments, electronic image processing device 120 may be a remote server, such as a server that resides in a cloud computing environment. In some such embodiments, the remote server, or at least some of the data stored thereon, may be accessible to authorized public safety personnel in multiple jurisdictions or locations. In some embodiments, electronic image capturing device 130 may share video stream data with two or more image processing devices 120, any of which may be mobile devices or stationary devices in various combinations.

In some embodiments, each of electronic image capturing device 130 and electronic image processing device 120 may be a mobile device, such as, for example, a hand-held smart telephone or radio, a body worn camera, or a dashboard-mounted camera worn or operated by a respective public safety employee. In such embodiments, each of electronic image capturing device 130 and electronic image processing device 120 may be capable of performing both image capturing and image processing. For example, electronic image capturing device 130 and electronic image processing device 120 may be used to perform image capturing at certain times and during certain live video sharing sessions and may be used to perform image processing at different times or during different live video sharing sessions. During live video sharing, the electronic computing device that captures the video stream and provides video data to one or more other electronic computing devices may be referred to as the "sending device" or the "sender" and an electronic computing device that receives the video data and performs the image processing and display techniques described herein may be referred to as the "receiving device" or the "receiver." In some embodiments, electronic image capturing device 130 and electronic image processing device 120 may be the same type of device.

In the illustrated embodiment, electronic image capturing device 130 includes image capture sensors or other image capture circuitry (shown as 132), metadata storage 136 for storing metadata associated with full video frames, metadata generation and control unit 134 for generating metadata to be communicated to electronic image processing device 120 along with video frame data for an associated full video frame, video segmenting unit 140 for segmenting video frames into object of interest portions and background portions, and full frame refreshment controller 138 for determining when and whether to push data representing respective full video frames, rather than streaming object of interest portions of video frames only, to electronic image processing device 120. In the illustrated embodiment, electronic image capturing device 130 also includes interface circuitry 150 for outputting video stream data to electronic image processing device 120 over interconnect 110. In some embodiments, full video frames pushed to electronic image processing device 120 may be pushed as separate object of interest portions and background portions that have been extracted from the full video frames by electronic image capturing device 130 prior to being pushed to electronic image processing device 120.

In various embodiments, metadata generation and control unit 134 may include an object of interest identifier, a movement profile generator, or both. An object of interest identifier may be operable to identify objects of interest within video frames using any suitable mechanism. For example, an object of interest identifier may automatically detect common objects, such as cars, people, animals, signs, or buildings, and may present a list of identified objects to a user for selection as an object of interest. In various embodiments, the object of interest identifier may use pattern matching, image matching, machine learning trained model recognition, or other techniques to automatically detect common objects. The user may then select one or more of the identified objects through audio input, a graphical user interface, text input, or another user interface mechanism. In some embodiments, an object of interest identifier may include speech recognition capability and may be operable to receive audio input through which a user describes an object of interest depicted in a video frame. In some embodiments, a user may provide input using one of the input mechanisms described above to distinguish an object of interest depicted in a video frame. For example, the user may enter a license plate number or color scheme of a particular vehicle of interest, a color scheme of clothing worn by a person of interest, or text that is visible on a vehicle, clothing, or other item associated with an object of interest to distinguish it from similar objects. In some embodiments, an object of interest identifier may be operable to receive user input, such as through a touch screen or a graphical user interface, indicating an object within a video frame that is considered an object of interest or delineating a portion of a video frame within which an object of interest is depicted. In some embodiments, once an object of interest or an object of interest portion of a video frame is identified, an object of interest identifier may store data identifying the object of interest or the object of interest portion of the video frame including, for example, a label for the object of interest, coordinates indicating the location of the object of interest within the video frame, data indicating the size or shape of the object of interest, or data indicating the boundaries of the object of interest portion of the video frame in metadata storage 136 along with an identifier of the associated full video frame. In some embodiments, an object of interest identifier may be or include a copy of an image used for image-matching to identify an object at the image capturing device, or a copy of a machine learning trained model used for identifying the object at the image capturing device. In embodiments in which each full video frame pushed to electronic image processing device 120 is pushed as a respective object of interest portion and a respective background portion that have been extracted from the full video frame by electronic image capturing device 130 prior to being pushed to electronic image processing device 120, the object of interest identifier may be or include the segmented object of interest portion itself.

In some embodiments, a movement profile generator may be operable to capture, using any suitable sensors, movement data associated with electronic image capturing device 130, such as a speed at which electronic image capturing device 130 is moving, an acceleration of electronic image capturing device 130, a direction in which electronic image capturing device 130 is moving, an altitude or a change in altitude of electronic image capturing device 130, or any combination of movement parameters, including a velocity vector indicating both the speed and direction of movement associated with electronic image capturing device 130. The movement profile generator may store the movement data in metadata storage 136 along with an identifier of the associated full video frame or frames.

In some embodiments, metadata associated with a full video frame may be communicated to electronic image processing device 120 using a relatively small portion of the network bandwidth allocated for sharing video stream data with electronic image processing device 120 over interconnect 110. In other embodiments, metadata associated with a full video frame may be communicated to electronic image processing device 120 over an out-of-band communication channel between electronic image capturing device 130 and electronic image processing device 120 (not shown in FIG. 1). In still other embodiments, the video data for a full video frame may itself be annotated with the metadata associated with the full video frame and sent to electronic image processing device 120. Other suitable techniques may be used to communicate metadata associated with a full video frame to electronic image processing device 120, in different embodiments.

In some embodiments, full frame refreshment controller 138 may be operable to determine whether a trigger condition for sending a full video frame has been met and, if so, to initiate a push of a full video frame, along with associated metadata, to electronic image processing device 120. One trigger condition for sending a full video frame may be a significant change in the movement parameters of electronic image capturing device 130, such as a significant change in the speed, direction, altitude, or velocity of movement or the acceleration of electronic image capturing device 130. Another trigger condition for sending a full video frame may be a significant change in the contents of the background portion of a video frame compared to one or more previous video frames. In some embodiments, a trigger condition for sending a full video frame may be the completion of a full frame refreshment cycle. For example, full frame refreshment controller 138 may be operable to estimate the number of frames in which an object of interest is depicted in approximately the same view based on the movement parameters for electronic image capturing device 130, such as speed, direction, altitude, or acceleration, and may set the value of the full frame refreshment cycle based on this number. In other embodiments, the full frame refreshment cycle value may be set to a default value (such as 5 or 10 frames) for electronic image capturing device 130 or to a user-specified value.

In the illustrated embodiment, electronic image processing device 120 includes metadata storage 122 for storing metadata associated with full video frames, background data storage 126 for storing data representing extracted background portions of full video frames received from electronic image capturing device 130, or transformed versions thereof, and display 128. In various embodiments, display 128 may include a suitable display such as, for example, a liquid crystal display (LCD) touch screen or an organic light-emitting diode (OLED) touch screen. In alternative embodiments, display 128 may include a suitable screen without tactile input capability. In the illustrated embodiment, electronic image processing device 120 also includes input interface circuitry 148 for receiving a video stream from electronic image capturing device 130 over interconnect 110.

In the illustrated embodiment, electronic image processing device 120 includes video stream processing unit 124 for processing and displaying video stream data received from electronic image capturing device 130. In the illustrated embodiment, video stream processing unit 124 includes a background extraction unit 142 for extracting and storing background portions of full video frames received from electronic image capturing device 130. In embodiments in which each full video frame pushed to electronic image processing device 120 is pushed as a respective object of interest portion and a respective background portion that have been extracted from the full video frame by electronic image capturing device 130 prior to being pushed to electronic image processing device 120, video stream processing unit 124 might not include a background extraction unit 142. Video stream processing unit 124 also includes a frame composition unit 144 for transforming background portions of full video frames received from electronic image capturing device 130 based on movement profile data associated with the full video frames and for rendering representations of full video frames, each of which includes an object of interest portion of a partial video frame received from electronic image capturing device 130 and a transformed version of a background portion of a full video frame received from electronic image capturing device 130. Video stream processing unit 124 may further include a fine tuning unit 146 for modifying a transformation applied to a background portion of a full video frame received from electronic image capturing device 130 in response to detecting that the transformation resulted in a background portion that is not well aligned with the object of interest portion of a partial video frame received from electronic image capturing device 130.

In other embodiments, a system for live video sharing may include more, fewer or different elements than those of system 100 as depicted in FIG. 1.

Figure 2A:
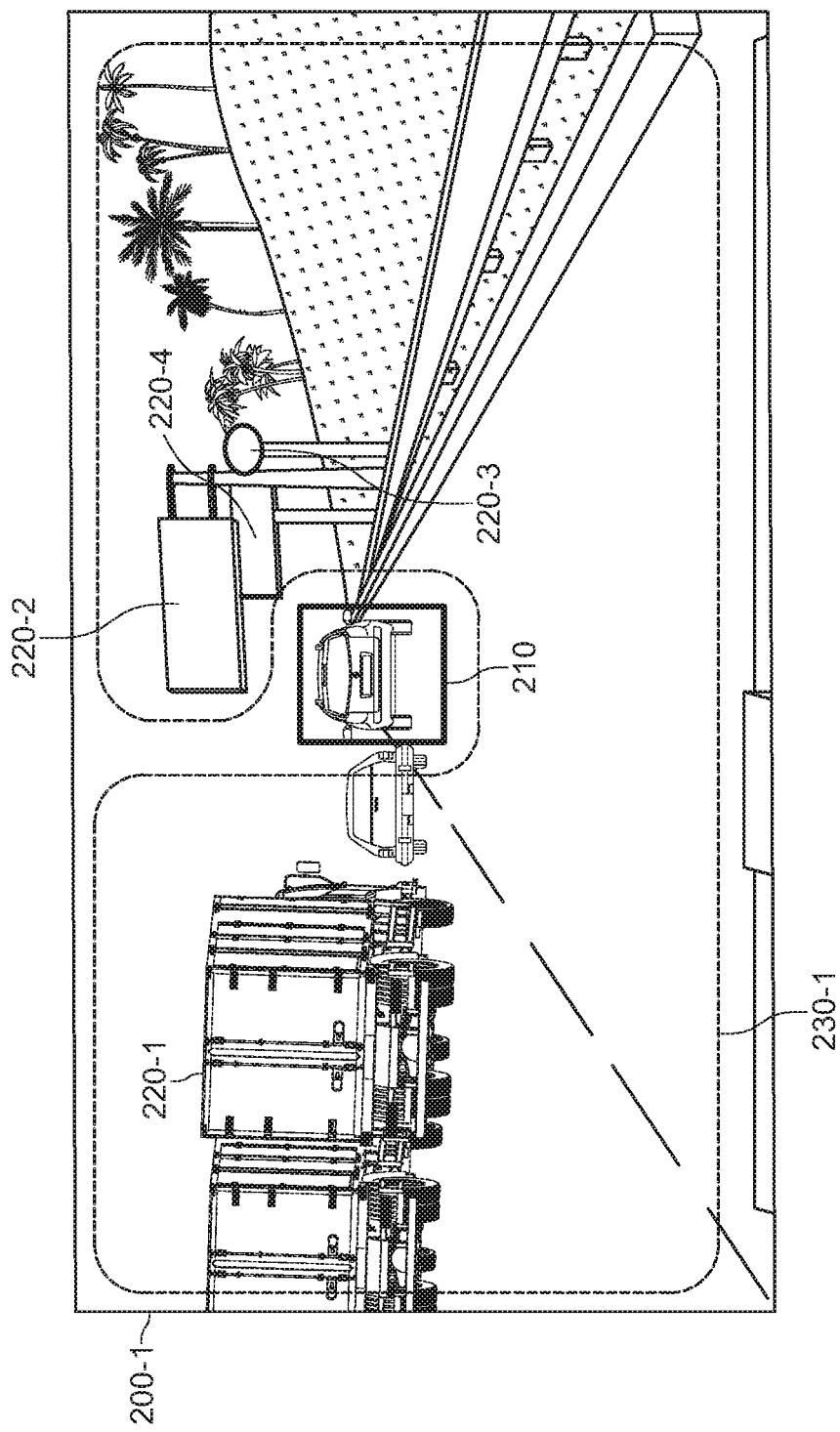
FIGS. 2A through 2D illustrate respective video frames of a video stream, each depicting an object of interest and a background portion, in accordance with some embodiments.

FIGS. 2A through 2D illustrate respective video frames of a video stream captured by a moving electronic image capturing device, such as by electronic image capturing device 130 of FIG. 1, each depicting an object of interest and a background portion, in accordance with some embodiments. More specifically, FIGS. 2A through 2D illustrate respective video frames of a video stream captured while following a particular vehicle, such as during a car chase. For example, FIG. 2A illustrates video frame 200-1 in which are depicted an object of interest portion 210, within which an object of interest is shown, and a background portion 230-1 exclusive of object of interest portion 210. In this example, the object of interest is a particular van and the background portion 230-1 includes, among other elements, four background objects 220. More specifically, background portion 230-1 includes a truck labeled as background object 220-1 and three signs labeled as background objects 220-2, 220-3, and 220-4, respectively.

In this example, the electronic image capturing device may, for any of a variety of reasons including, but not limited to, those described herein, push the full details of video frame 200-1, including video data for the entire frame, an object of interest identifier, and a movement profile for the electronic image capturing device, to an electronic image processing device. For example, in some embodiments, the first frame of a video stream captured during a live video sharing session may be pushed to the electronic image processing device as a full video frame. In another example, a full video frame may be pushed to the electronic image processing device following the completion of a full frame refreshment cycle. In addition, a full video frame may be pushed to the electronic image processing device when and if another trigger condition, such as the detection of a significant change in the movement profile of the electronic image capturing device or a significant change in the background portion of consecutive video frames or over a small number of frames, is met. In some embodiments, the electronic image processing device may request that a full video frame be pushed to the electronic image processing device in response to detection, by the electronic image processing device, of a significant misalignment between a streamed object of interest portion and a transformed background for a particular video frame. In some embodiments, the bandwidth reduction techniques described herein may be initiated in response to receiving a request from the electronic image processing device to reduce network bandwidth consumption due to, for example, insufficient bandwidth or signal strength between the image capturing and image processing devices to support full-resolution video streaming of all video frames in the video stream, or a connection to a network with reduced capacity or to a network of a particular type that does not support full-resolution video streaming between the particular image capturing and image processing devices.

In at least some embodiments, a determination that the bandwidth reduction techniques described herein should be applied or that a full video frame should be pushed to the electronic image processing device may be made automatically by, for example, full frame refreshment controller 138 illustrated in FIG. 1. In other embodiments, the application of the bandwidth reduction techniques described herein or the sending of a particular full or partial video frame to the electronic image processing device may be initiated in response to user input indicating an explicit request to do so. In some embodiments, video frame 200-1 may be pushed to the electronic image processing device at a predetermined target resolution.

Figure 2B:
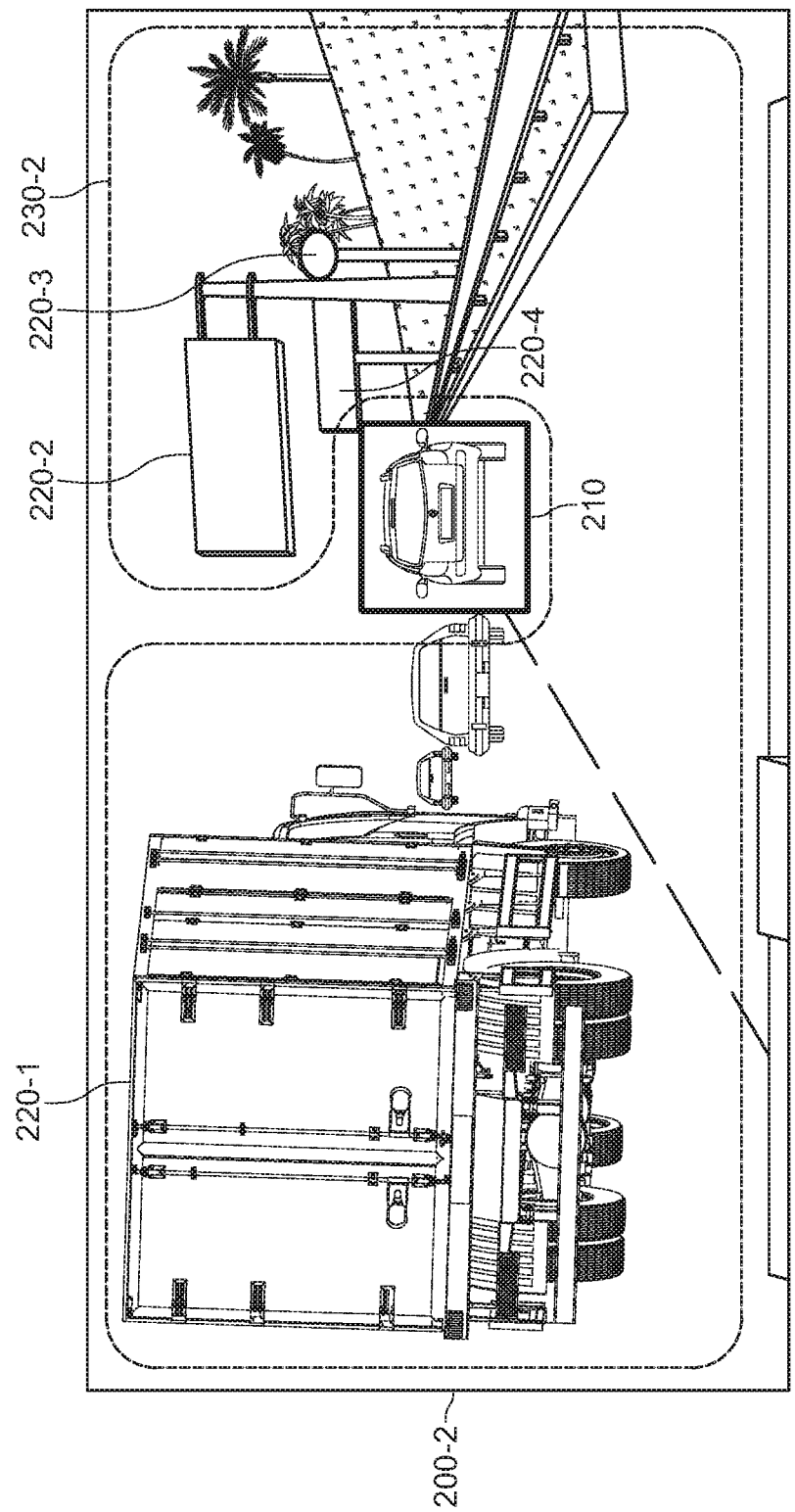

FIG. 2B illustrates video frame 200-2 in which are depicted object of interest portion 210 and a respective background portion 230-2. In video frame 200-2, the object of interest within object of interest portion 210 is shown at approximately the same scale as in video frame 200-1. However, the background objects 220-2, 220-3, and 220-4 are enlarged as compared to the scale at which they are depicted in video frame 200-1 due to the movement of the electronic image capturing device between the time at which video frame 200-1 was captured and the time at which video frame 200-2 was captured. In this example, background object 220-1 is also enlarged as compared to the scale at which it is depicted in video frame 200-1. However, this is due at least in part to the movement of background object 220-1 relative to the movement of the object of interest within object of interest portion 210 or the movement of the electronic image capturing device. In this example, because the contents of the respective background portion 230-2 depicted in video frame 200-2 is not significantly changed compared to the contents of the respective background portion 230-1 depicted in video frame 200-1, the electronic image capturing device may not push the full details of video frame 200-2 to the electronic image processing device, but may stream only the object of interest portion 210 of frame 200-2 to the electronic image processing device. In some embodiments, the object of interest portion 210 of video frame 200-2 may be streamed to the electronic image processing device at the predetermined target resolution.

Figure 2C:
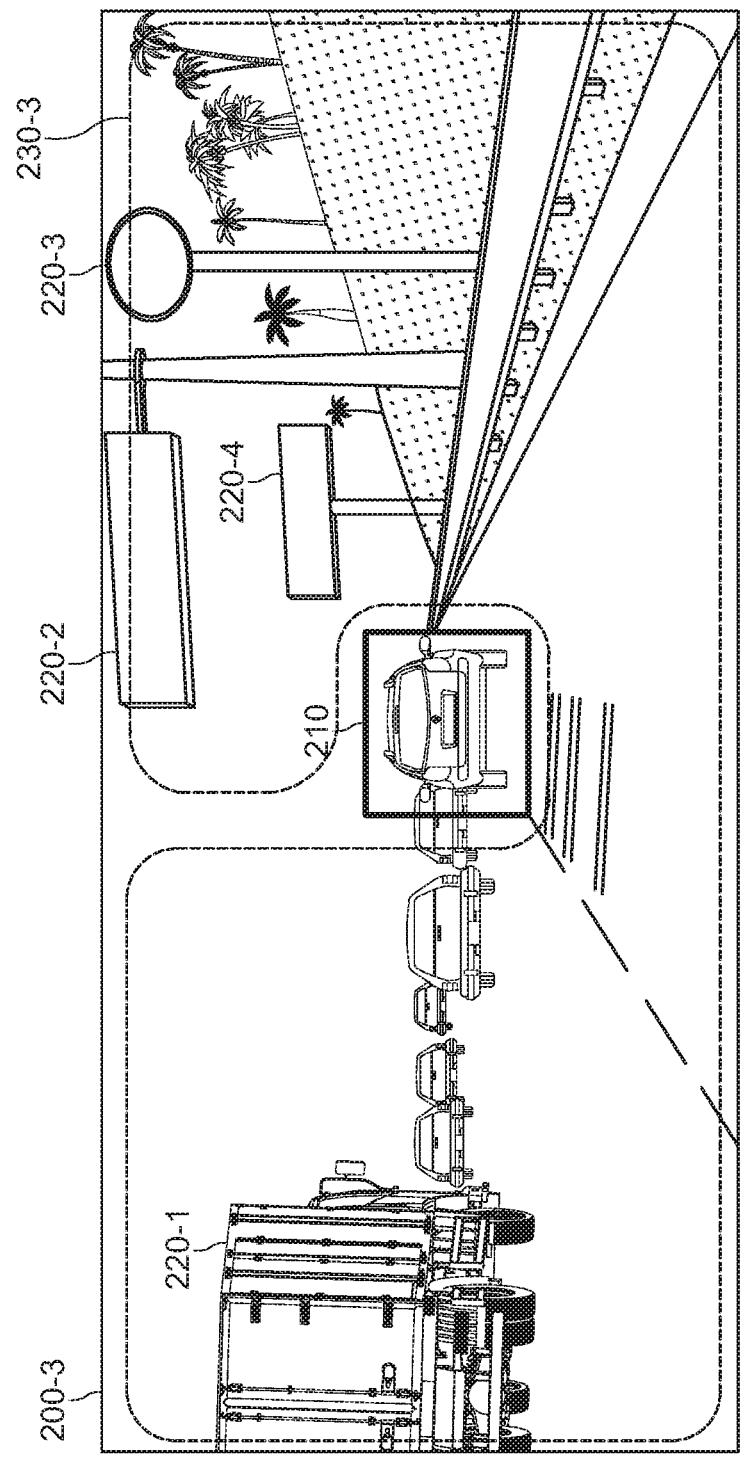

FIG. 2C illustrates video frame 200-3 in which are depicted object of interest portion 210 and a respective background portion 230-3. In video frame 200-3, the object of interest within object of interest portion 210 is shown at approximately the same scale as in video frame 200-2. However, the background objects 220-2, 220-3, and 220-4 are enlarged as compared to the scale at which they are depicted in video frame 200-2 due to the movement of the electronic image capturing device between the time at which video frame 200-2 was captured and the time at which video frame 200-3 was captured. In this example, background object 220-1 is reduced in scale as compared to the scale at which it is depicted in video frame 200-2 due, at least in part, to the movement of background object 220-1 relative to the movement of object of the object of interest within interest portion 210 or the movement of the electronic image capturing device. In this example, because the contents of the respective background portion 230-3 depicted in video frame 200-3 is not significantly changed compared to the contents of the respective background portion 230-2 depicted in video frame 200-2, the electronic image capturing device may not push the full details of video frame 200-3 to the electronic image processing device, but may stream only the object of interest portion 210 of frame 200-3 to the electronic image processing device. In some embodiments, the object of interest portion 210 of video frame 200-3 may be streamed to the electronic image processing device at the predetermined target resolution.

Figure 2D:
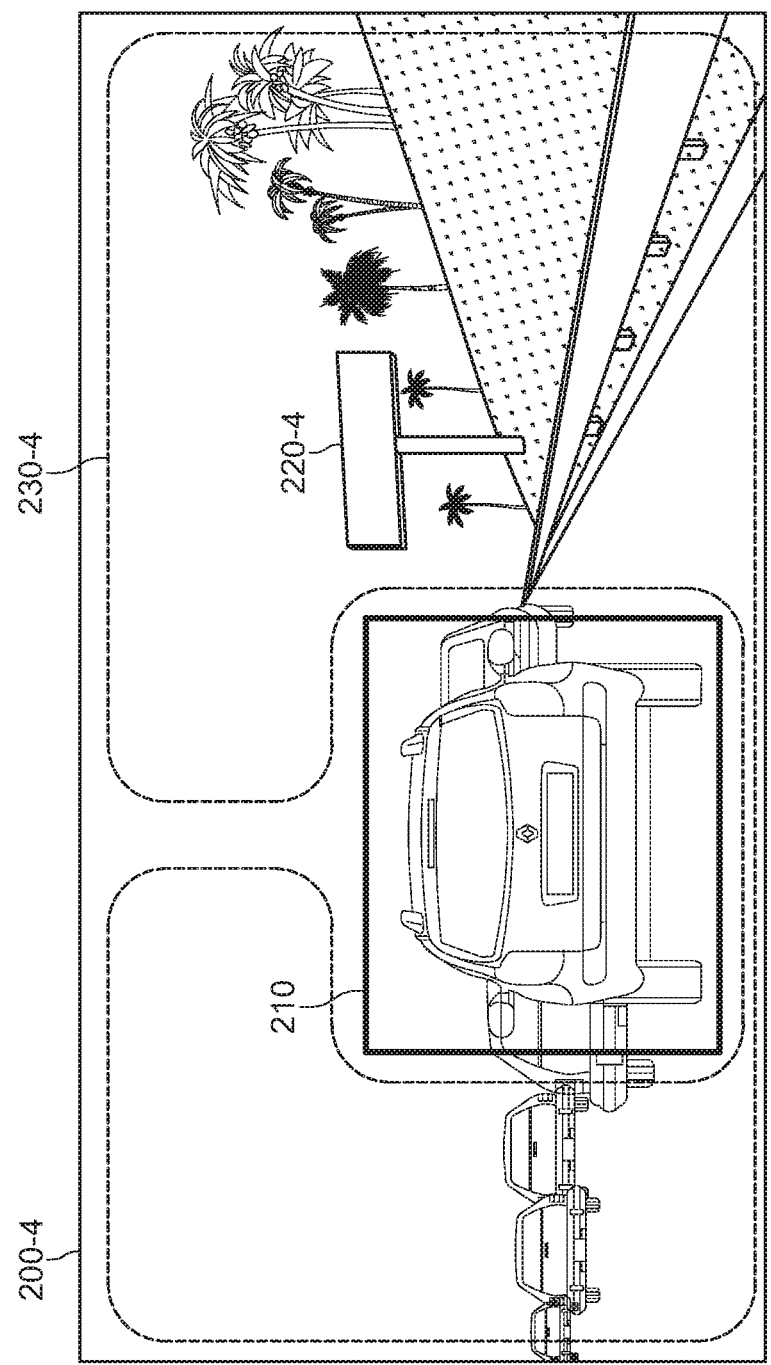

FIG. 2D illustrates video frame 200-4 in which are depicted object of interest portion 210 and a respective background portion 230-4. In video frame 200-4, the object of interest within object of interest portion 210 is shown enlarged as compared to the scale at which it is depicted in video frame 200-3 due, at least in part, to the movement of the object of interest within interest portion 210 relative to the movement of the electronic image capturing device. In this example, background objects 220-1, 220-2, and 220-3 are no longer visible, due to the movement of the electronic image capturing device beyond a position at which they are visible to the electronic image capturing device. Background object 220-4 is shown enlarged as compared to the scale at which it is depicted in video frame 200-3 due to the movement of the electronic image capturing device between the time at which video frame 200-3 was captured and the time at which video frame 200-4 was captured. In this example, because the contents of the respective background portion 230-4 depicted in video frame 200-4 is significantly changed compared to the contents of the respective background portion 230-3 depicted in video frame 200-3, the electronic image capturing device may push the full details of video frame 200-4, including video data for the entire frame, an object of interest identifier, and an updated movement profile for the electronic image capturing device, to the electronic image processing device. In some embodiments, video frame 200-4 may be pushed to the electronic image processing device at the predetermined target resolution for the video stream.

In embodiments in which the electronic image capturing device is a dashboard-mounted camera or another image capturing device that communicates with other component within a vehicle, an internal communications network of the vehicle may interconnect components of the vehicle and enable communication with the vehicle in accordance with any of a variety of communications protocols including, but not limited to, Controller Area Network (CAN), Local Interconnect Network (LIN), or Vehicle Area Network (VAN) interface protocols. The personal area network may enable communication between a mobile device, camera, or other electronic image capturing device and other electronic devices or the internal communications network of the vehicle using a wireless technology such as WiFi, Wireless Ethernet, Bluetooth, IEEE (Institute of Electrical and Electronics Engineers) 802.15, Infrared Data Association (IrDA), or ZigBee, among other technologies.

Figure 3:
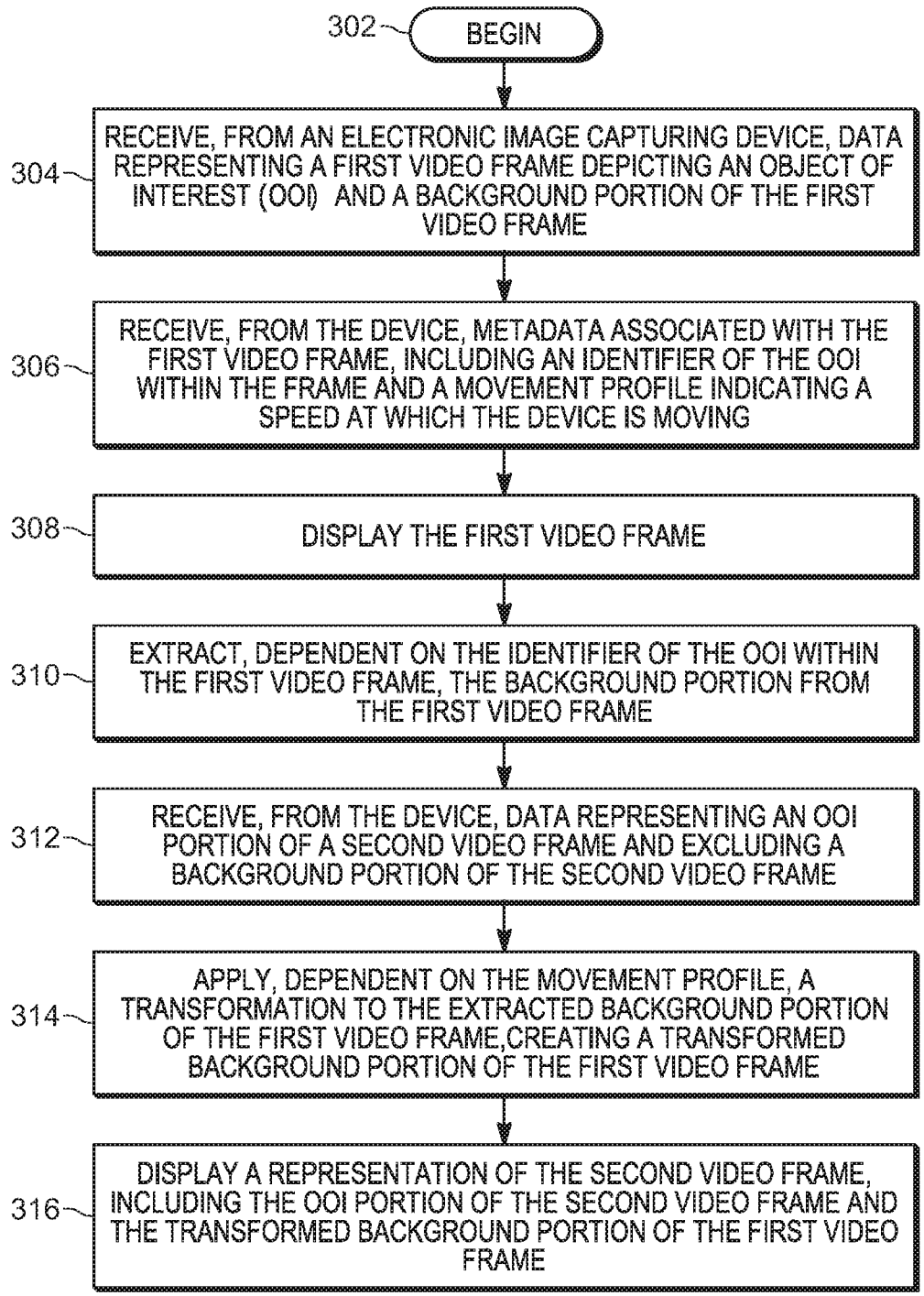
FIG. 3 is a flowchart of a method of processing a video stream during live video sharing, in accordance with some embodiments.

Referring now to FIG. 3, there is provided a flow diagram of selected elements of an example method 300 for processing a video stream during live video sharing, in accordance with some embodiments. While a particular order of operations is indicated in FIG. 3 for illustrative purposes, the timing and ordering of such operations may vary where appropriate without negating the purpose and advantages of the examples set forth in detail throughout the remainder of this disclosure. In various embodiments, some or all of the operations of method 300 may be performed by video stream processing unit 124 of electronic image processing device 120 illustrated in FIG. 1.

In this example embodiment, method 300 begins with block 302 and continues with block 304 where, during live video streaming between an electronic image capturing device and the electronic image processing device, the electronic image processing device receives, from the electronic image capturing device, data representing a first video frame depicting an object of interest (001) and a background portion of the first video frame exclusive of the object of interest. The received data may represent the full details of the first video frame including both an object of interest portion of the video frame within which the object of interest is depicted and the background portion of the video frame. In some embodiments, each full video frame pushed to the image processing device may be pushed as a respective object of interest portion and a respective background portion that were extracted from the full video frame by the image capturing device prior to being pushed to the image processing device. In some embodiments, the data may be received at a predetermined target resolution for the video stream.

In block 306, the method includes receiving, from the electronic image capturing device, metadata associated with the first video frame, including an identifier of the object of interest within the frame and a movement profile for the electronic image capturing device. The identifier of the object of interest may be, or include, a label for the object of interest, coordinates indicating the location of the object of interest within the first video frame, data indicating the size or shape of the object of interest, or data indicating the boundaries of the object of interest portion of the first video frame. In some embodiments, an object of interest identifier may be or include a copy of an image used for image-matching to identify an object at the image capturing device, or a copy of a machine learning trained model used for identifying the object at the image capturing device. In embodiments in which each full video frame pushed to the electronic image processing device is pushed as a respective object of interest portion and a respective background portion that have been extracted from the full video frame by the electronic image capturing device prior to being pushed to the electronic image processing device, the object of interest identifier may be or include the segmented object of interest portion itself. The movement profile includes, among other elements already discussed herein, data indicating a speed at which the electronic image capturing device is moving. In various embodiments, the video data for the video frame may be annotated with the metadata, or the metadata may be communicated to the electronic image processing device using a relatively small portion of the network bandwidth allocated for sharing video stream data or over an out-of-band communication channel between the electronic image capturing device and the electronic image processing device.

Referring again to FIG. 3, in block 308, method 300 includes displaying the first video frame, such as on display 128. In some embodiments, the first video frame may be displayed at the predetermined target resolution for the video stream. The predetermined target resolution might or might not be the resolution at which the video data for the first video frame was received.

At block 310, if the first full video frame received at block 304 was not segmented into an object of interest portion and a background portion by the electronic image capturing device as set forth above, method 300 includes extracting the background portion from the first video frame, dependent on the identifier of the object of interest within the first video frame. For example, the identifier of the object of interest may include a label for the object of interest, coordinates indicating the location of the object of interest within the video frame, data indicating the size or shape of the object of interest, or data indicating the boundaries of the object of interest portion of the video frame. In some embodiments, an object of interest identifier may be or include a copy of an image used for image-matching to identify an object at the image capturing device, or a copy of a machine learning trained model used for identifying the object at the image capturing device. In embodiments in which each full video frame pushed to the electronic image processing device is pushed as a respective object of interest portion and a respective background portion that have been extracted from the full video frame by the electronic image capturing device prior to being pushed to the electronic image processing device, the object of interest identifier may be or include the segmented object of interest portion itself. Based on this information, a background extraction unit 142 of the video stream processing unit 124 may be operable to segment the video frame into an object of interest portion, as defined by the object of interest identifier, and a background portion that includes the remainder of the video frame, and to store the background portion in background data storage 126 for subsequent use.

At block 312, the electronic image processing device receives, from the electronic image capturing device, data representing an object of interest portion of a second video frame and excluding a background portion of the second video frame. In other words, the received data may represent only a part of the full second video frame captured at the image capturing device 130. In some embodiments, the data representing the object of interest portion may be received at the predetermined target resolution for the video stream, or at some other lower resolution based on an available bandwidth.

At block 314, method 300 includes applying, dependent on the movement profile, a transformation to the extracted background portion of the first video frame, thus creating a transformed background portion of the first frame. In some embodiments, dependent on the speed at which the electronic image capturing device is moving, a zooming effect may be applied such that at least a portion of the extracted background portion is enlarged. For example, the higher the speed, the more the extracted background portion is enlarged, simulating the view as the electronic image capturing device moves through the area depicted in the background portion. In some embodiments, the movement profile may include an indication of the acceleration of the electronic image capturing device and the zooming effect may be further dependent on the acceleration of the electronic image capturing device, with the amount by which the extracted background portion is enlarged increasing as the electronic image capturing device accelerates. In some embodiments, the movement profile may include an indication of a direction in which the electronic image capturing device is moving or a change in altitude for the electronic image capturing device and the transformation may include applying a panning effect or a rotation effect to the extracted background portion dependent on the direction in which the electronic image capturing device is moving or the change in altitude. For example, if the electronic image capturing device is moving in a direction other than the direction in which the device is pointing, the extracted background portion may be transformed to simulate the view captured by the device as it moves.

At block 316, a representation of the second video frame, including the object of interest portion of the second video frame and the transformed background portion of the first video frame is displayed, such as on display 128. In some embodiments, the representation of the second video frame may be displayed at the predetermined target resolution for the video stream. The predetermined target resolution might or might not be the resolution at which the video data for the first video frame or the data for the object of interest portion of the second video frame was received.

In at least some embodiments, some or all of the operations of method 300 illustrated in FIG. 3 may be repeated one or more times during a live video sharing session as data representing additional full video frames and data representing partial video frames are received from the electronic image capturing device.

As described above in reference to FIGS. 2A through 2D, in operation, an electronic image capturing device, such as electronic image capturing device 130 illustrated in FIG. 1, may, for an initial video frame, such as video frame 200-1 illustrated in FIG. 2A, push the full details of the video frame, including video data for the entire frame, an object of interest identifier, and a current movement profile for the electronic image capturing device, to a receiving device, such as electronic image processing device 120 illustrated in FIG. 1. For two or more subsequent video frames including, in this example, video frame 200-2 illustrated in FIG. 2B and video frame 200-3 illustrated in FIG. 2C, the electronic image capturing device may stream only the object of interest portion 210 in a real-time manner to the receiving device, thus reducing network bandwidth consumption by not streaming the respective background portions of these video frames. When a full frame refreshment cycle is complete, or when another trigger condition for pushing a new full video frame is met, the electronic image capturing device may stream an additional full video frame, such as video frame 200-4 illustrated in FIG. 2D.

Figure 4:
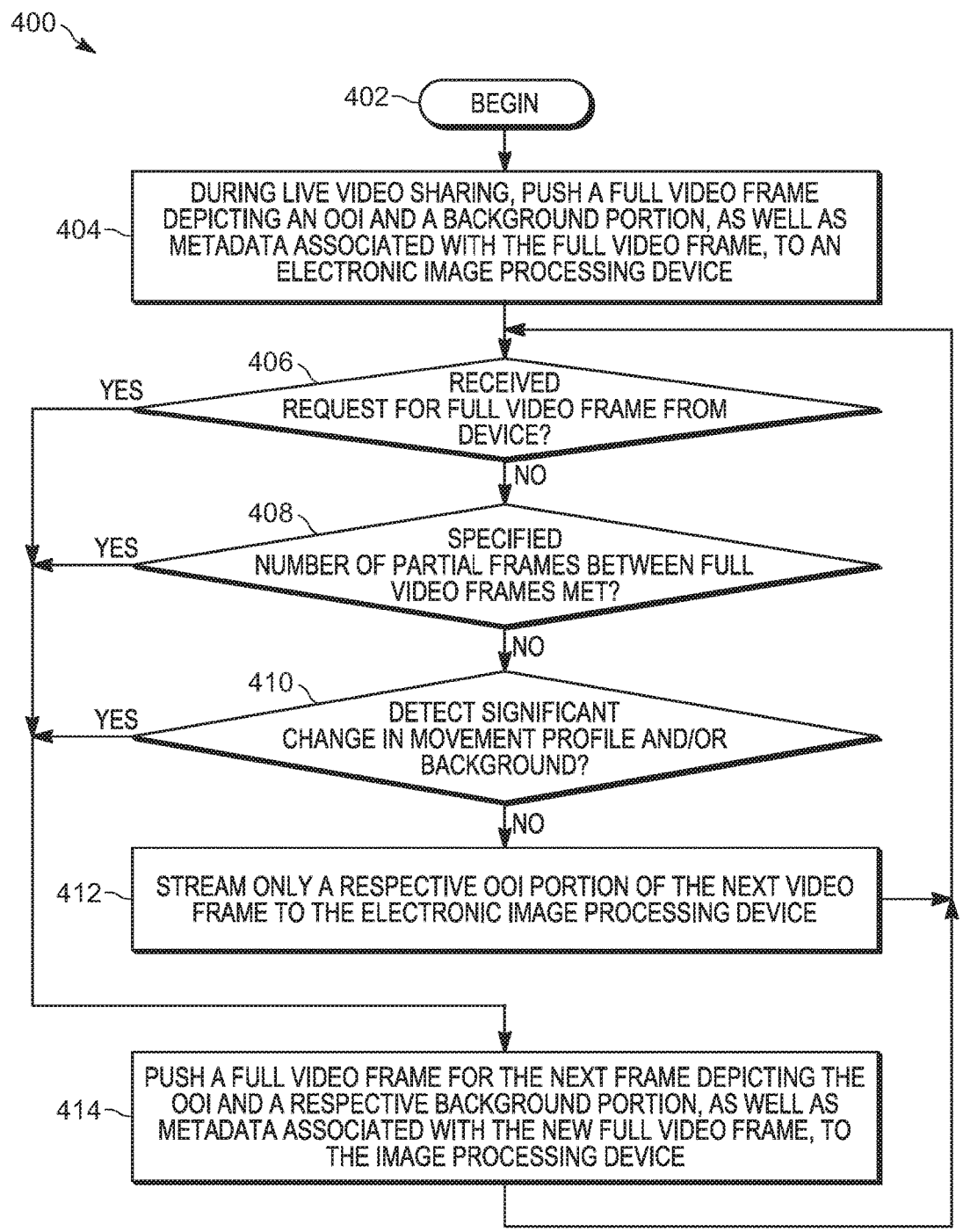
FIG. 4 is a flowchart of a method of sharing video frame data with an electronic image processing device, in accordance with some embodiments.

Referring now to FIG. 4, there is provided a flow diagram of selected elements of an example method 400 for sharing video frame data with an electronic image processing device. While a particular order of operations is indicated in FIG. 4 for illustrative purposes, the timing and ordering of such operations may vary where appropriate without negating the purpose and advantages of the examples set forth in detail throughout the remainder of this disclosure. In various embodiments, some or all of the operations of method 400 may be performed by elements of electronic image capturing device 130 illustrated in FIG. 1.

In this example embodiment, method 400 begins with block 402 and continues with block 404 where, during a live video sharing session, the electronic image capturing device pushes a full video frame depicting an object of interest portion and a background portion, as well as metadata associated with the full video frame, to an electronic image processing device. The metadata may include an identifier of the object of interest depicted in the full video frame. The identifier of the object of interest may include a label for the object of interest, coordinates indicating the location of the object of interest within the video frame, data indicating the size or shape of the object of interest, or data indicating the boundaries of the object of interest portion of the video frame. In some embodiments, an object of interest identifier may be or include a copy of an image used for image-matching to identify an object at the image capturing device, or a copy of a machine learning trained model used for identifying the object at the image capturing device. In embodiments in which each full video frame pushed to the electronic image processing device is pushed as a respective object of interest portion and a respective background portion that have been extracted from the full video frame by the electronic image capturing device prior to being pushed to the electronic image processing device, the object of interest identifier may be or include the segmented object of interest portion itself. The metadata may also include a current movement profile for the electronic image capturing device including, for example, a speed at which the electronic image capturing device is moving, an acceleration of the electronic image capturing device, a direction in which the electronic image capturing device is moving, an altitude or a change in altitude for electronic image capturing device 130, or any combination of movement parameters, including a velocity vector indicating both the speed and direction of movement associated with the electronic image capturing device. In some embodiments, the metadata may also include a full frame refreshment cycle value, which may be a default value, a user-specified value, or a value calculated or estimated by the electronic image capturing device based on the current movement profile. In some embodiments, the full video frame may be provided to the electronic image processing device at a predetermined target resolution for the video stream, or at a lower resolution that is further dependent upon available bandwidth, among other possibilities.

At block 406, it is determined whether or not a request for a full video frame has been received from the electronic image processing device. If so, method 400 proceeds to 414. Otherwise, method 400 continues at 408. For example, the electronic image processing device may send a request for a full video frame to the electronic image capturing device if and when a significant misalignment between a streamed object of interest portion and a transformed background portion is detected. Conversely, in some embodiments, a request may be received from the electronic image processing device to reduce network bandwidth consumption due to, for example, insufficient bandwidth or signal strength between the image capturing and image processing devices to support full-resolution video streaming of all video frames in the video stream, or a connection to a network with reduced capacity or to a network of a particular type that does not support full-resolution video streaming between the particular image capturing and image processing devices.

At block 408, it is determined whether or not a specified number of partial video frames to be streamed between full video frames, corresponding to a full frame refreshment cycle, has been met. If so, method 400 proceeds to 414. Otherwise, method 400 continues at 410. For example, in some embodiments, the metadata associated with the most recent full video frame may include an indication of a full frame refreshment cycle value representing the number of video frames for which data representing a respective object of interest portion of the video frame and excluding data representing a respective background portion of the video frame that are expected to be streamed to the electronic image processing device between full video frames. Until and unless the number of partial video frames streamed since the last full video frame was pushed matches the full frame refreshment cycle value, the electronic image capturing device may continue to stream partial video frames to the electronic image processing device.

In the illustrated example, method 400 includes determining whether or not there are any significant changes associated with the next received video frame. For example, if, at block 410, a significant change has been detected in the movement profile of the electronic image capturing device, in the background of the next video frame as compared to the background portion of the previous video frame, or both, method 400 proceeds to 414. Otherwise, method 400 continues to 412. For example, a sudden and significant change of speed or acceleration may be detected (such as a sudden braking, a sudden acceleration, or a device being dropped or thrown), a sudden and significant change in direction may be detected (such as a lane change or turning a corner), or the contents of the background may change significantly (such as when a background object disappears from view or an unexpected object comes into view).

At block 412, only a respective object of interest portion of the next video frame is streamed in a real-time manner to the electronic image processing device, after which method 400 returns to 406. In some embodiments, the respective object of interest portion of the next video frame may be streamed at the predetermined target resolution for the video stream.

At block 414, a full video frame for the next frame, depicting the object of interest and a respective background portion, as well as metadata associated with the new full video frame, are pushed to the electronic image processing device. In some embodiments, the full video frame for the next frame may be provided to the electronic image processing device at the predetermined target resolution for the video stream.

As shown in FIG. 4, in at least some embodiments, some or all of the operations of method 400 illustrated in FIG. 4 may be repeated, beginning at block 406, during a live video sharing session to push additional full video frames and to stream additional partial video frames, as appropriate, to the electronic image processing device.

In practice, the movement profile of an image capturing device, such as a dashboard-mounted camera, may not be smoothly constant. Slight variations in speed, acceleration, altitude, or direction due to a bumpy road, slight steering changes, or slight changes in pressure on the accelerator or brake might not be significant enough to justify a full frame refreshment. However, even slight variations can cause a transformed background portion and a streamed object of interest portion for a representation of a particular video frame to be out of sync or misaligned because the movement profile assumed when applying the transformation will not match the actual movement profile corresponding to the particular video frame. In some embodiments, the electronic image processing device may compare the change rates of the two portions of the representation of the particular video frame as a feedback mechanism for improving the transformation effect. When the object of interest portion and the transformed background portion are not in sync, this feedback mechanism may cause the rendering algorithm to alter the assumptions of the movement parameters, such as the speed, during transformation of the background portion to retain a near-seamless viewing experience.

For example, when the electronic image capturing device is moving with a smoothly constant speed and acceleration, in accordance with the most recently received movement profile, the streamed object of interest portion and the transformed background portion may be well-aligned in the representation of the corresponding video frame created by the electronic image processing device. When the electronic image capturing device experiences minor speed or acceleration changes (e.g., changes on the order of 5% or less), compared to the most recently received movement profile, the streamed object of interest portion and the transformed background portion may be slightly misaligned in the representation of the corresponding video frame created by the electronic image processing device, and the electronic image processing device may apply a fine tuning technique to at least partially compensate for the misalignment. On the other hand, when the electronic image capturing device experiences vigorous speed or acceleration changes (e.g., changes greater than 10-15%), compared to the most recently received movement profile, the streamed object of interest portion and the transformed background portion could be significantly misaligned, or completely incompatible, in a representation of the corresponding video frame created by the electronic image processing device. In this case, the electronic image capturing device may push a new full frame to the electronic image processing device.

Similarly, when the electronic image capturing device is moving in a constant direction, in accordance with the most recently received movement profile, and with a consistent view, the streamed object of interest portion and the transformed background portion may be well-aligned in the representation of the corresponding video frame created by the electronic image processing device. When the electronic image capturing device experiences minor changes in direction (e.g., changes on the order of 5 degrees or less), compared to the most recently received movement profile, or minor changes in the view (e.g., changes in fewer than 5% of the pixels) due to slight steering changes or a camera orientation change, the streamed object of interest portion and the transformed background portion may be slightly misaligned in the representation of the corresponding video frame created by the electronic image processing device, and the electronic image processing device may apply a fine tuning technique to at least partially compensate for the misalignment. On the other hand, when the electronic image capturing device experiences vigorous direction or view changes, such as a lane change or a turn that results in greater than a 10-15 degree direction change or a change in greater than 10-15% of the pixels, the streamed object of interest portion and the transformed background portion could be significantly misaligned, or completely incompatible, in a representation of the corresponding video frame created by the electronic image processing device. In this case, the electronic image capturing device may push a new full frame to the electronic image processing device.

In at least some embodiments, the electronic image processing device may be operable to determine a first amount or rate of change between the object of interest portions of two consecutive video frames and a second amount or rate of change between the background portions of the two consecutive video frames, such as on a pixel-by-pixel basis or on an object-by-object basis, and to compare the first amount or rate of change and the second amount or rate of change. In response to determining that the difference between the first amount or rate of change and the second amount or rate of change exceeds a first, relatively low, predetermined threshold difference (e.g., a 5% difference or a 2% difference), the electronic image processing device may modify the transformation of the extracted background portion of the current video frame to achieve better alignment between the object of interest portion and the background portion, as described herein. In some embodiments, if the difference between the first amount or rate of change and the second amount or rate of change exceeds a second, relatively higher, predetermined threshold difference (e.g., a difference of more than 10-15%), the electronic image processing device may request a new full video frame, and a corresponding updated movement profile, from the electronic image capturing device.

In some embodiments, the electronic image capturing device may, for two consecutive video frames, perform a pixel-by-pixel comparison or an object-by-object comparison to determine a percentage of the area that changed in the object of interest portions, in terms of pixels, vs. a percentage of the area that changed in the background portions, in terms of pixels. If the difference between the two percentages exceeds a predetermined threshold (e.g., a 10% difference or a 15% difference), the electronic image capturing device may push a new full video frame to the electronic image processing device.

Figure 5A:
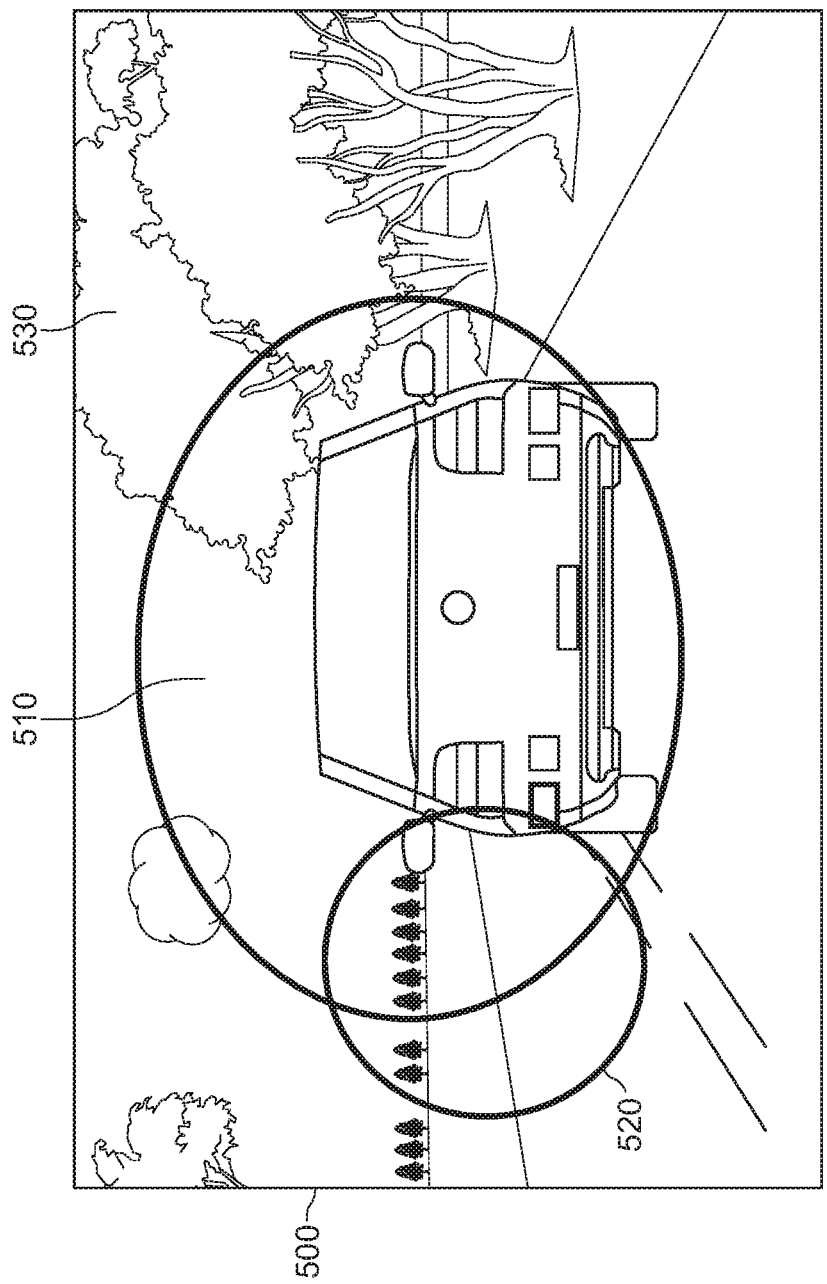
FIGS. 5A through 5C illustrate an example of fine tuning a representation of a given video frame created by combining a transformed background portion of a previously received full video frame and an object of interest portion of the given video frame, in accordance with some embodiments.
Figure 5B:
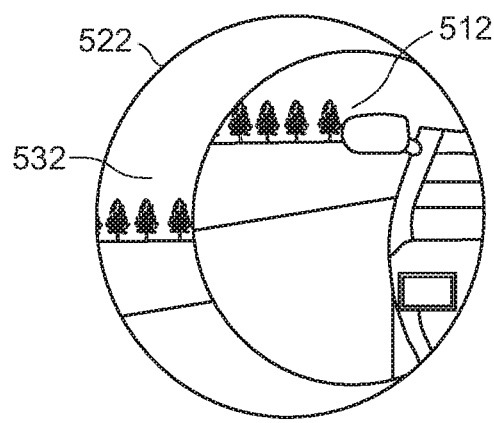
Figure 5C:
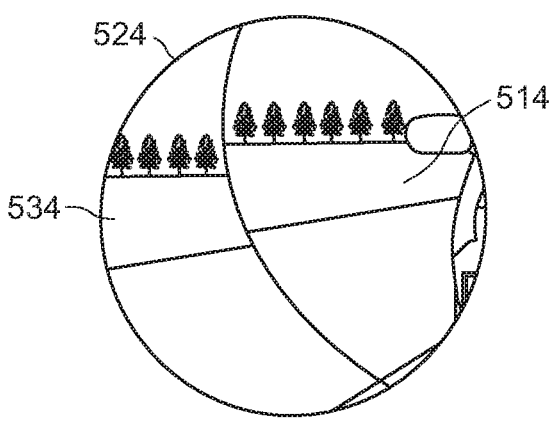

FIGS. 5A through 5C illustrate an example of fine tuning a representation of a given video frame created by combining a transformed background portion of a previously received full video frame and an object of interest portion of the given video frame, in accordance with some embodiments. For example, FIG. 5A illustrates a video frame 500 that was captured by an electronic image capturing device and that depicts an object of interest portion 510 and a background portion 530. The portion of video frame 500 labeled as 520 encompasses both a sub-portion of object of interest portion 510 and a sub-portion of background portion 530.

In this example, only the object of interest portion 510 was streamed to an electronic image processing device during a live video sharing session. The electronic image processing device created a representation of video frame 500 by transforming a background portion extracted from a previously received full video frame, based on the corresponding movement profile for the electronic image capturing device, and the streamed object of interest portion 510.

FIG. 5B illustrates an expanded view 502 of portion 522 of the representation of video frame 500 generated by the electronic image processing device corresponding to portion 520 of video frame 500. As shown in FIG. 5B, a sub-portion 532 of the transformed background portion is out of alignment with a sub-portion 512 of the streamed object of interest portion 510. For example, one or more parameters of the movement profile may have changed slightly, such as from 50 mph to 51 mph or 49 mph, or the composition of the background may have changed slightly. In the illustrated example, the electronic image processing device performs a fine tuning operation to compensate, at least partially, for the misalignment. More specifically, the electronic image processing device may be operable to modify the transformation effect applied to the previously extracted background portion, such as by assuming a different speed, acceleration, direction, altitude, or change in altitude than was indicated in the movement profile most recently received from the electronic image capturing device, perhaps as a function of a determined difference in a rate of change. The electronic image processing device may also be operable to replace the previously transformed background portion with the modified transformed background portion in the representation of video frame 500.

FIG. 5C illustrates an expanded view 504 of portion 524 of the result of the fine tuning. In this example, a sub-portion 534 of the modified transformed background portion is depicted as being in better alignment with a sub-portion 514 of the streamed object of interest portion 510 than was the case in FIG. 5B.

As described herein, in operation, an electronic image processing device, such as electronic image processing device 120 illustrated in FIG. 1, may receive the full details of an initial video frame, such as video frame 200-1 illustrated in FIG. 2A, including video data for the entire frame, an object of interest identifier, and a current movement profile for the electronic image capturing device, from a sending device, such as electronic image capturing device 130 illustrated in FIG. 1. The electronic image processing device may display video frame 200-1 and extract the background portion from video frame 200-1. For two or more subsequent video frames including, in this example, video frame 200-2 illustrated in FIG. 2B and video frame 200-3 illustrated in FIG. 2C, the electronic image processing device may receive only the object of interest portion 210 in a real-time manner from the sending device. The electronic image processing device may generate and display representations of these video frames, each including the streamed object of interest portion and a respective transformed version of the background portion extracted from video frame 200-1. When a full frame refreshment cycle is complete, or when another trigger condition for pushing a new full video frame is met, the electronic image processing device may receive an additional full video frame, such as video frame 200-4 illustrated in FIG. 2D, from the electronic image capturing device.

Figure 6:
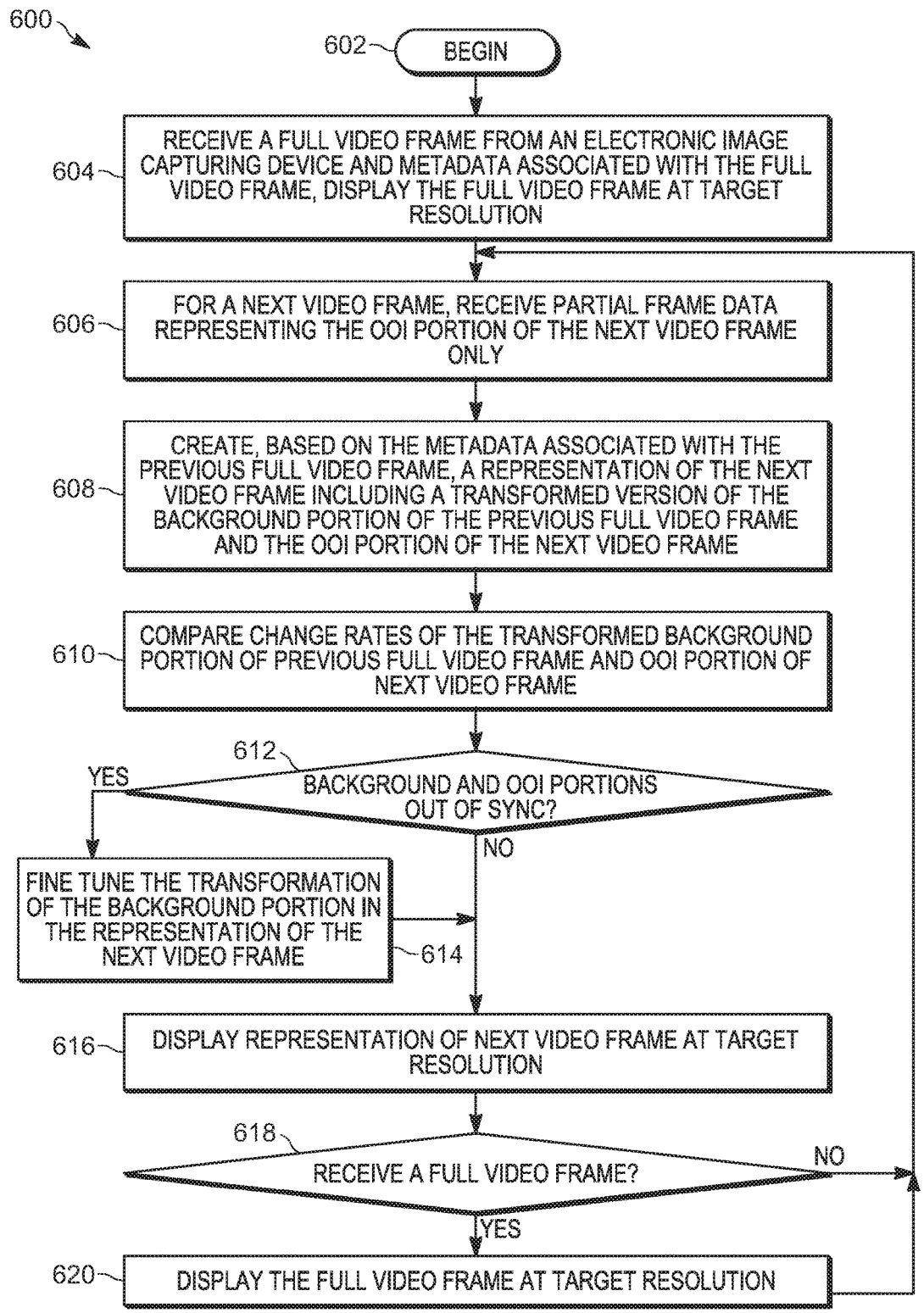
FIG. 6 is a flowchart of a method of processing and displaying video frame data received from an electronic image capturing device, in accordance with some embodiments.

Referring now to FIG. 6, there is provided a flow diagram of selected elements of an example method 600 for processing and displaying video frame data received from an electronic image capturing device, in accordance with some embodiments. While a particular order of operations is indicated in FIG. 6 for illustrative purposes, the timing and ordering of such operations may vary where appropriate without negating the purpose and advantages of the examples set forth in detail throughout the remainder of this disclosure. In various embodiments, some or all of the operations of method 600 may be performed by video stream processing unit 124 of electronic image processing device 120 illustrated in FIG. 1.

In this example embodiment, method 600 begins with block 602 and continues with block 604, where, during a live video sharing session, a full video frame and metadata associated with the full video frame are received from an electronic image capturing device, after which the full video frame is displayed at a predetermined target resolution.

At block 606, method 600 includes, for a next video frame, receiving partial video frame data representing the object of interest portion of the next video frame only from the electronic image capturing device.

At block 608, based on the metadata associated with the previous full video frame, a representation of the next video frame is created including a transformed version of the background portion of the previous full video frame and the object of interest portion of the next video frame. For example, the background transformation, including one or more of a zooming effect, a panning effect and a rotating effect, may be rendered in accordance with the most recently received movement profile as a rough guide.

As described above, the electronic image processing device may be operable to fine tune the degree of transformation for the background portion, based on a comparison between an amount or rate of change in the transformed background portion and an amount or rate of change in the streamed object of interest portion. For example, at block 610, the electronic image processing device compares the change rates of the transformed background portion of the previous full video frame and the object of interest portion of the next video frame.

At block 612, it is determined whether or not the background and object of interest portions are out of sync based on differences in the change rates. If so, method 600 proceeds to 614. Otherwise, method 600 continues at 616.

At block 614, the electronic image processing device fine tunes the transformation of the background portion in the representation of the next video frame. For example, the electronic image processing device may perform a transformation of the background portion of the previous full video frame assuming a different speed, acceleration, direction, altitude, or change in altitude than was indicated in the movement profile most recently received from the electronic image capturing device, perhaps as a function of a determined difference in a rate of change, and may replace the previously transformed background portion with the modified transformed background portion in the representation of the next video frame.

At block 616, the representation of next video frame, with or without fine tuning, as applicable, is displayed at the predetermined target resolution.

At block 618, it may be determined whether or not a full video frame is received as the next frame. If so, method 600 may continue to 620. Otherwise, method 600 may return to 606.

At block 620, the full video frame is displayed at the predetermined target resolution. In some embodiments, when a new full video frame is received, the method may also include flushing the extracted background data, transformed background data, and further modified background data from background data storage 126 and replacing it in background data storage 126 with background data extracted from the newly received video data representing a new full video frame. Similarly, the method may include flushing previously received metadata from metadata storage 122 and replacing it in metadata storage 122 with metadata associated with the new full video frame.

In some embodiments, if and when a more significant misalignment between a streamed object of interest portion and a transformed background is detected prior to receiving a new full video frame, the electronic image processing device may send a request to the electronic image capturing device for a full video frame from which to extract a respective background portion for subsequent use (not shown in FIG. 6). In one example, even a slight difference in a movement parameter may result in a misalignment between an object of interest portion and a background portion that, when compounded over multiple successive frames, cannot be adequately corrected by fine tuning unit 146.

In at least some embodiments, some or all of the operations of method 600 illustrated in FIG. 6 may be repeated, beginning at block 606, one or more times during a live video sharing session as data representing additional full video frames and partial video frames is received from the electronic image capturing device.

Figure 7:
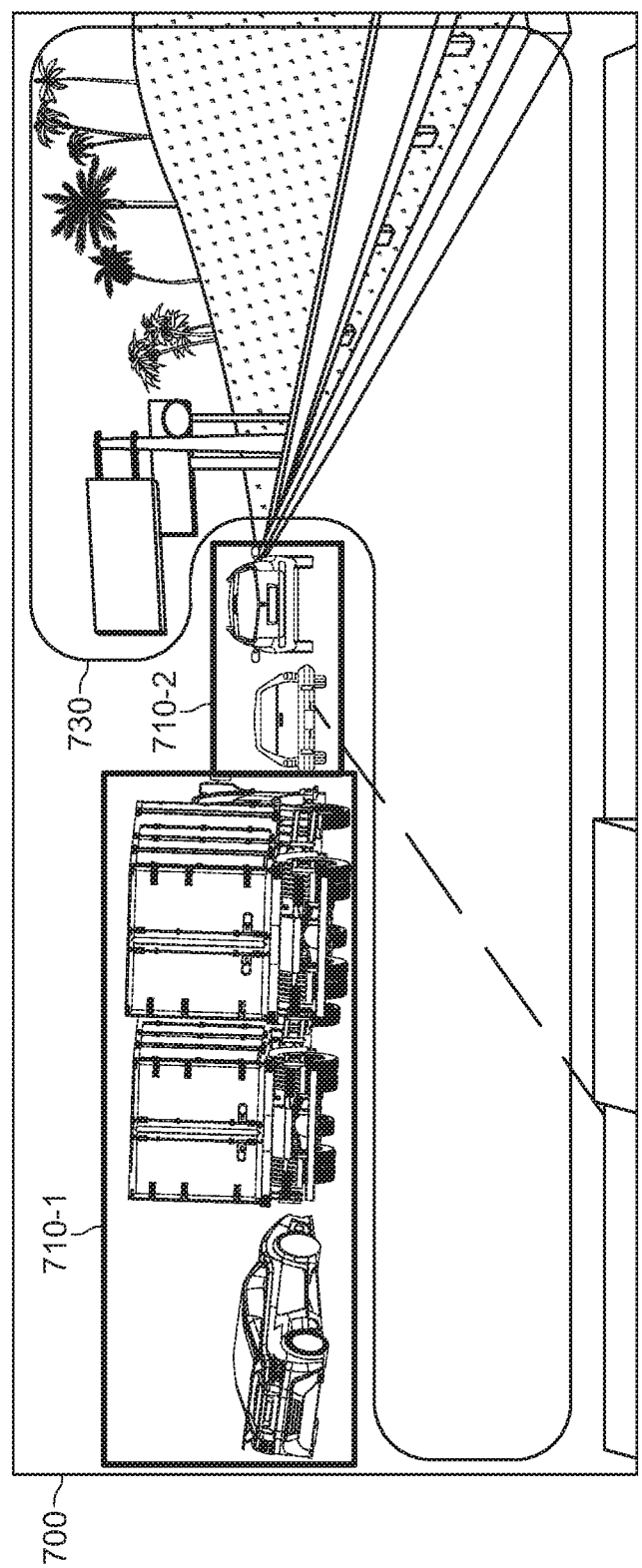
FIG. 7 illustrates an example video frame in which multiple objects of interest and a background portion are depicted.

Although the techniques disclosed herein for reducing network bandwidth consumption have been described primality in terms of video frames that include a single object of interest, in other embodiments these techniques may be applied to video streams in which the video frames include two or more objects of interest. FIG. 7 illustrates an example video frame 700 in which multiple objects of interest and a background portion are depicted. In the illustrated example, two object of interest portions 710 and a background portion 730 are depicted within frame 700. More specifically, object of interest portion 710-1 includes two commercial trucks and a passenger car and object of interest portion 710-2 includes a van and a passenger car.

In this example, an electronic image capturing device may be operable to include identifiers of each object of interest, or each object of interest portion 710, in the metadata associated with video frame 700. The electronic image capturing device may push the full details of video frame 700 to an image processing device, including the object of interest identifiers and a current movement profile for the electronic image capturing device. For subsequent video frames including these two object of interest portions, the electronic image processing device may stream data representing both object of interest portions 710 to the image processing device, but excluding background portion 730.

The image processing device may generate and display a respective representation of each of the subsequent video frames including the two object of interest portions 710 and a background portion extract from video frame 700 and transformed according to the most recently received movement profile for the electronic image capturing device.

Figure 8:
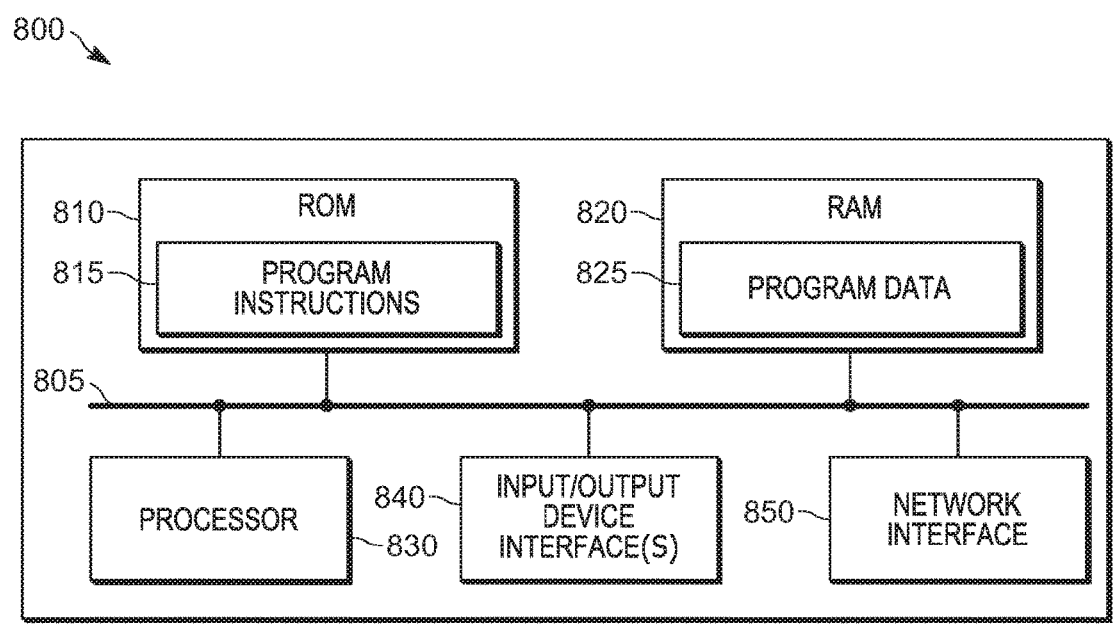
FIG. 8 is a block diagram illustrating a video stream processing unit of an electronic device, in accordance with some embodiments.

In some embodiments, a video stream processing unit of an electronic image processing device may be operable to perform, among other functions, all or a portion of the methods described herein for processing and displaying video stream data during a live video sharing session. FIG. 8 is a block diagram illustrating selected elements of a video stream processing unit 800 of an electronic image processing device, such as image processing device 120 illustrated in FIG. 1, in accordance with some embodiments. In the illustrated example, video stream processing unit 800 includes a Read Only Memory (ROM) 810, a Random Access Memory (RAM) 820, an electronic processor 830, one or more input/output device interfaces 840 for communicating with locally attached devices and components, and a network interface 850 for communicating with a remote server or device (not shown in FIG. 8), all of which are coupled to a system bus 805 through which they communicate with each other. In various embodiments, the electronic processor 830 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware.

In the illustrated embodiment, ROM 810 stores program instructions 815, at least some of which may be executed by the electronic processor 830 to perform the methods described herein. For example, any or all of the operations of method 300 illustrated in FIG. 3 and method 600 illustrated in FIG. 6 may be performed by program instructions 815 executing on electronic processor 830 of video stream processing unit 800. For example, program instructions 815 may, when executed by electronic processor 830, be operable to receive and display full video frames depicting an object of interest and a background portion, to receive and store metadata associated with full video frames including object of interest identifiers and current movement profiles, to extract and store background portions from full video frames, to receive partial video frames including only an object of interest portion, and to generate and display representations of video frames for which only partial data was received by transforming an extracted background portion in accordance with the most recently received movement profile and including the received object of interest portions, among other functions. In some embodiments, program instructions 815 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 815 may include program instructions that when executed by electronic processor 830 implement other functionality features of the electronic image processing device.

In this example embodiment, RAM 820 may, from time to time, store program data 825 including, without limitation, local copies of metadata, extracted background data, transformed background data, or other data accessible by program instruction 815 and used in performing the methods described herein. In some embodiments, RAM 820 may also store data used in performing other functions of the electronic image processing device. In some embodiments, RAM 820 may, from time to time, store local copies of all or a portion of program instructions 815 or other program instructions copied from ROM 810 and/or received over network interface 850.

In this example embodiment, input/output device interfaces 840 may include one or more analog input interfaces, such as one or more analog-to-digital (A/D) convertors, or digital interfaces for receiving signals or data from, and sending signals or data to, one or more input/output devices. For example, video stream processing unit 800 may communicate with a display 128, a digital video camera, or another electronic image capturing device 130, as illustrated in FIG. 1, through various input/output device interfaces 840. In some embodiments, input/output device interfaces 840 may include one or more external memory interfaces through which video stream processing unit 800 may be coupled to an external memory (not shown in FIG. 8). Such an external memory may include, for example, a hard-disk drive (HDD), an optical disk drive such as a compact disk (CD) drive or digital versatile disk (DVD) drive, a solid-state drive (SSD), a tape drive, a flash memory drive, or a tape drive, to name a few. In various embodiments, each of metadata storage 122 and background data storage 126 may reside in external memory or in program data 825.

In various embodiments, input/output device interfaces 840 may operate to receive user input, to provide system output, or a combination of both. User input may be provided via, for example, a keyboard or keypad, a microphone, soft keys, icons, or soft buttons on a touch screen of display 128, a scroll ball, a mouse, buttons, and the like. Input/output device interfaces 840 may also include other input mechanisms, which for brevity are not described herein and which may be implemented in hardware, software, or a combination of both. In some embodiments, input/output device interfaces 840 may include a graphical user interface (GUI) generated, for example, by electronic processor 830 from program instructions 815 and program data 825 and presented on display 128, enabling a user to interact with display 128.

Network interface 850 may be a suitable system, apparatus, or device operable to serve as an interface between electronic processor 830 and a network. Network interface 850 may enable video stream processing unit 800 to communicate over a network using a suitable transmission protocol and/or standard, including, but not limited to, transmission protocols and/or standards enumerated below with respect to the discussion of the network. In some embodiments, network interface 850 may be communicatively coupled via a network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof. Network interface 850 may enable wired and/or wireless communications to and/or from video stream processing unit 800 or other elements of an electronic image capturing device. In some embodiments, video stream data representing full and partial video frames and metadata may also or alternatively be received over network interface 850 rather than one of input/output device interfaces 840.

In some embodiments, an electronic image capturing device, such as electronic image capturing device 130 of FIG. 1, may include elements similar to those of video stream processing unit 800 of electronic image processing device 120. In one such embodiment, ROM 810 stores program instructions 815, at least some of which may be executed by the electronic processor 830 to perform any or all of the operations of method 400 illustrated in FIG. 4. For example, program instructions 815 may, when executed by electronic processor 830, be operable to capture video data for a video stream, to generate and store metadata associated with video frames, to push full video frames and associated metadata to an electronic image processing device, to segment video frames into object of interest portions and background portions, to stream only the object of interest portions of other video frames to the electronic image processing device, to estimate or calculate a full frame refreshment cycle, and to determine when and whether to push additional full video frames to the electronic image processing device, among other functions.

The systems and methods described herein for processing video stream data during live video sharing may provide technical benefits over conventional techniques for reducing network bandwidth consumption for video streaming, particularly in the context of public safety applications in which at least the image capturing device is in motion. For example, by initially, and from time to time afterward, providing metadata including object of interest identifiers and movement profile information for full video frames to a receiving device, the image capturing device may only need to stream object of interest portions of the majority of video frames to the receiving device, thus reducing the network bandwidth consumption and the dependence on the wireless communication signal strength of the underlying network during live video sharing.

In the disclosed systems, the receiving device is operable to extract a respective background portion from each full video frame received and to utilize the associated metadata to generate and display representations of video frames for which only partial data was received, applying transformations to the extracted background portions to simulate the effects of the movement of the image capturing device on the view depicted in each video frame. Unlike with some existing techniques for reducing network bandwidth consumption, the video frames displayed by the receiver may be full-resolution video frames constructed from full-resolution rendered background portions and full-resolution streamed object of interest portions. In some embodiments, the systems and methods described herein may expand the usability of the image capturing and image processing devices by freeing-up network bandwidth for other applications, while providing a high-quality viewing experience for a remote observer even when the video sharer experiences poor network connectivity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. A method of processing a video stream, comprising the steps of:
   receiving, at a receiving electronic computing device from an electronic image capturing device:
      first data representing a first full video frame of the video stream in which an object of interest and a first background portion exclusive of the object of interest are depicted; and
      first metadata associated with the first full video frame, the first metadata comprising:
         a first identifier of the object of interest within an object of interest portion of the first full video frame; and
         a first movement profile for the electronic image capturing device comprising an indication of a current speed at which the electronic image capturing device is moving;
   displaying, at a display coupled to the receiving electronic computing device, the first full video frame;
   extracting, by the receiving electronic device and dependent on the first identifier of the object of interest, the first background portion from the first full video frame;
   receiving, from the electronic image capturing device, second data representing an object of interest portion of a second full video frame in which the object of interest is depicted, the second data excluding data representing a second background portion of the second full video frame;
   applying, by the receiving electronic device and dependent on the first movement profile, a transformation to the extracted first background portion to create a transformed first background portion; and
   displaying, at the display, a representation of the second full video frame comprising the object of interest portion of the second full video frame and the transformed first background portion.

2. The method of claim 1, wherein applying the transformation comprises applying, dependent on the current speed at which the electronic image capturing device is moving, a zooming effect in which at least a portion of the first background portion is enlarged.

3. The method of claim 2, wherein:
the first movement profile further comprises an indication of an acceleration of the electronic image capturing device; and
applying the zooming effect is further dependent on the acceleration of the electronic image capturing device.

4. The method of claim 1, wherein:
the first movement profile further comprises an indication of a direction in which the electronic image capturing device is moving or an indication of a change in altitude for electronic image capturing device; and
applying the transformation comprises applying, to the first background portion dependent on the direction in which the electronic image capturing device is moving or the change in altitude, at least one of a panning effect and a rotation effect.

5. The method of claim 1, further comprising:
receiving, from the electronic image capturing device, third data representing an object of interest portion of a third full video frame in which the object of interest is depicted, the third data excluding data representing a third background portion of the third full video frame;
applying, by the receiving electronic device and dependent on the first movement profile, a further transformation to the transformed first background portion to create a further transformed first background portion; and
displaying, at the display, a representation of the third full video frame comprising the object of interest portion of the third video frame and the further transformed first background portion.

6. The method of claim 1, further comprising:
receiving, from the electronic image capturing device:
third data representing a third full video frame in which the object of interest and a third background portion exclusive of the object of interest are depicted; and
second metadata associated with the third full video frame, the second metadata comprising:
a second identifier of the object of interest within an object of interest portion of the third full video frame; and
a second movement profile for the electronic image capturing device comprising an indication of a current speed at which the electronic image capturing device is moving;
displaying, at the display, the third full video frame;
extracting, by the receiving electronic device and dependent on the second identifier of the object of interest, the third background portion from the third full video frame;
receiving, from the electronic image capturing device, fourth data representing an object of interest portion of a fourth full video frame in which the object of interest is depicted, the fourth data excluding data representing a fourth background portion of the fourth full video frame;
applying, by the receiving electronic device and dependent on the second movement profile, a transformation to the extracted third background portion to create a transformed third background portion; and
displaying, at the display, a representation of the fourth full video frame comprising the object of interest portion of the third video frame and the transformed third background portion.

7. The method of claim 6, wherein the metadata associated with the first full video frame further comprises an indication of a number of video frames for which data representing a respective object of interest portion of the video frame and excluding data representing a respective background portion of the video frame expected to be received prior to receiving the third data.

8. The method of claim 6, further comprising, subsequent to receiving the second data and prior to receiving the third data, providing a request to the electronic image capturing device for data representing a full video frame in which the object of interest and a respective background portion exclusive of the object of interest are depicted at a specified resolution.

9. The method of claim 6, further comprising:
determining, by the electronic image capturing device subsequent to sending the second data, that a trigger condition for providing data representing a full video frame in which the object of interest and a respective background portion exclusive of the object of interest are depicted is met; and
sending, by the electronic image capturing device in response to determining that the trigger condition has been met, the third data.

10. The method of claim 1, further comprising, prior to displaying the representation of the second full video frame:
determining a first amount or rate of change between the object of interest portions of the first and second full video frames;
determining a second amount or rate of change between the first background portion and the transformed first background portion;
comparing the first amount or rate of change and the second amount or rate of change; and
in response to determining that a difference between the first amount or rate of change and the second amount or rate of change exceeds a predetermined threshold difference:
applying, by the receiving electronic device, a modified transformation to the extracted first background portion to create a modified transformed first background portion; and
updating the representation of the second full video frame to replace the transformed first background portion with the modified transformed first background portion.

11. An electronic image processing device, comprising:
a display;
input interface circuitry operable to receive a video stream from an electronic image capturing device; and
a video stream processing unit operable to:
receive, from the electronic image capturing device via the input interface circuitry:
first data representing a first full video frame of the video stream in which an object of interest and a first background portion exclusive of the object of interest are depicted; and
first metadata associated with the first full video frame, the first metadata comprising:
a first identifier of the object of interest within an object of interest portion of the first full video frame; and
a first movement profile for the electronic image capturing device comprising an indication of a current speed at which the electronic image capturing device is moving;

display, on the display, the first full video frame;
extract, dependent on the first identifier of the object of interest, the first background portion from the first full video frame;
receive, from the electronic image capturing device, second data representing an object of interest portion of a second full video frame in which the object of interest is depicted, the second data excluding data representing a second background portion of the second full video frame;
apply, dependent on the first movement profile, a transformation to the extracted first background portion to create a transformed first background portion; and
display, on the display, a representation of the second full video frame comprising the object of interest portion of the second full video frame and the transformed first background portion.

12. The electronic image processing device of claim 11, wherein to apply the transformation, the video stream processing unit is further operable to apply, to the extracted first background portion and dependent on the current speed at which the electronic image capturing device is moving, a zooming effect in which at least a portion of the extracted first background portion is enlarged.

13. The electronic image processing device of claim 11, wherein:
the first movement profile further comprises an indication of a direction in which the electronic image capturing device is moving or an indication of a change in altitude for electronic image capturing device; and
to apply the transformation, the video stream processing unit is further operable to apply, to the extracted first background portion and dependent on the direction in which the electronic image capturing device is moving or the change in altitude, at least one of a panning effect and a rotation effect.

14. The electronic image processing device of claim 11, wherein the video stream processing unit is further operable to:
receive, from the electronic image capturing device, third data representing an object of interest portion of a third full video frame in which the object of interest is depicted, the third data excluding data representing a third background portion of the third full video frame;
apply, dependent on the first movement profile, a further transformation to the transformed first background portion to create a further transformed first background portion; and
display, on the display, a representation of the third full video frame comprising the object of interest portion of the third full video frame and the further transformed first background portion.

15. The electronic image processing device of claim 11, wherein the video stream processing unit is further operable to:
receive, from the electronic image capturing device:
third data representing a third full video frame in which the object of interest and a third background portion exclusive of the object of interest are depicted; and
second metadata associated with the third full video frame, the second metadata comprising:
a second identifier of the object of interest within an object of interest portion of the third full video frame; and
a second movement profile for the electronic image capturing device comprising an indication of a current speed at which the electronic image capturing device is moving;
display, on the display, the third full video frame;
extract, dependent on the second identifier of the object of interest, the third background portion from the third full video frame;
receive, from the electronic image capturing device, fourth data representing an object of interest portion of a fourth full video frame in which the object of interest is depicted, the fourth data excluding data representing a fourth background portion of the fourth full video frame;
apply, dependent on the second movement profile, a transformation to the extracted third background portion to create a transformed third background portion; and
display, on the display, a representation of the fourth full video frame comprising the object of interest portion of the third full video frame and the transformed third background portion.

16. The electronic image processing device of claim 11, wherein, prior to displaying the representation of the second full video frame, the video stream processing unit is further operable to:
determine a first amount or rate of change between the object of interest portions of the first and second full video frames;
determine a second amount or rate of change between the first background portion and the transformed first background portion;
compare the first amount or rate of change and the second amount or rate of change; and
in response to a determination that a difference between the first amount or rate of change and the second amount or rate of change exceeds a predetermined threshold difference:
apply a modified transformation to the extracted first background portion to create a modified transformed first background portion; and
update the representation of the second full video frame to replace the transformed first background portion with the modified transformed first background portion.

17. A non-transitory, computer-readable storage medium having program instructions stored thereon that when executed by an electronic processor cause the electronic processor to perform:
receiving, from an electronic image capturing device:
first data representing a first full video frame of a video stream in which an object of interest and a first background portion exclusive of the object of interest are depicted; and
first metadata associated with the first full video frame, the first metadata comprising:
a first identifier of the object of interest within an object of interest portion of the first full video frame; and
a first movement profile for the electronic image capturing device comprising an indication of a current speed at which the electronic image capturing device is moving;
displaying, on a display device, the first full video frame;
extracting, dependent on the first identifier of the object of interest, the first background portion from the first full video frame;
receiving, from the electronic image capturing device, second data representing an object of interest portion of a second full video frame in which the object of interest is depicted, the second data excluding data representing a second background portion of the second full video frame;

applying, dependent on the first movement profile, a transformation to the extracted first background portion to create a transformed first background portion; and displaying, on the display device, a representation of the second full video frame comprising the object of interest portion of the second full video frame and the transformed first background portion.

18. The non-transitory, computer-readable storage medium of claim 17, wherein:

the first movement profile further comprises one or more of:
- an indication of an acceleration of the electronic image capturing device; and
- an indication of a direction in which the electronic image capturing device is moving; and
- an indication of a change in altitude for electronic image capturing device; and applying the transformation comprises one or more of:
- applying, to the extracted first background portion and dependent on the current speed at which the electronic image capturing device is moving or the acceleration of the electronic image capturing device, a zooming effect in which at least a portion of the extracted first background portion is enlarged; and
- applying, to the extracted first background portion and dependent on the direction in which the electronic image capturing device is moving or the change in altitude, at least one of a panning effect and a rotation effect.

19. The non-transitory, computer-readable storage medium of claim 17, wherein, when executed by the electronic processor, the program instructions further cause the electronic processor to perform:

receiving, from the electronic image capturing device:
  third data representing a third full video frame in which the object of interest and a third background portion exclusive of the object of interest are depicted; and
  second metadata associated with the third full video frame, the second metadata comprising:
    a second identifier of the object of interest within an object of interest portion of the third full video frame; and
    a second movement profile for the electronic image capturing device comprising an indication of a current speed at which the electronic image capturing device is moving;

displaying, on the display device, the third full video frame;

extracting, dependent on the second identifier of the object of interest, the third background portion from the third full video frame;

receiving, from the electronic image capturing device, fourth data representing an object of interest portion of a fourth full video frame in which the object of interest is depicted, the fourth data excluding data representing a fourth background portion of the fourth full video frame;

applying, dependent on the second movement profile, a transformation to the extracted third background portion to create a transformed third background portion; and displaying, on the display device, a representation of the fourth full video frame comprising the object of interest portion of the third full video frame and the transformed third background portion.

20. The non-transitory, computer-readable storage medium of claim 17, wherein, when executed by the electronic processor, the program instructions further cause the electronic processor to perform, prior to displaying the representation of the second full video frame:

determining a first amount or rate of change between the object of interest portions of the first and second full video frames;

determining a second amount or rate of change between the first background portion and the transformed first background portion;

comparing the first amount or rate of change and the second amount or rate of change; and in response to determining that a difference between the first amount or rate of change and the second amount or rate of change exceeds a predetermined threshold difference:
  applying a modified transformation to the extracted first background portion to create a modified transformed first background portion; and
  updating the representation of the second full video frame to replace the transformed first background portion with the modified transformed first background portion.

* * * * *